US012575475B2

(12) United States Patent
Casper et al.

(10) Patent No.: US 12,575,475 B2
(45) Date of Patent: Mar. 17, 2026

(54) METHOD AND SYSTEM FOR ESTIMATING PERFORMANCE FOR POSITION-SPECIFIC CONTROL OF AN AGRICULTURAL MACHINE

(71) Applicant: Deere & Company, Moline, IL (US)

(72) Inventors: Robert T. Casper, Davenport, IA (US); Nathaniel J. Hartsock, Bettendorf, IA (US); Ryan M. Krogh, Granger, IA (US); Doug S. Sauder, San Francisco, CA (US)

(73) Assignee: DEERE & COMPANY, Moline, IL (US)

( * ) Notice: Subject to any disclaimer, the term of this patent is extended or adjusted under 35 U.S.C. 154(b) by 268 days.

(21) Appl. No.: 18/446,056

(22) Filed: Aug. 8, 2023

(65) Prior Publication Data

US 2024/0341218 A1      Oct. 17, 2024

Related U.S. Application Data

(60) Provisional application No. 63/496,056, filed on Apr. 14, 2023.

(51) Int. Cl.
| | |
|---|---|
| *A01B 79/00* | (2006.01) |
| *G05D 1/00* | (2006.01) |
| *G06V 20/10* | (2022.01) |

(52) U.S. Cl.
CPC ......... *A01B 79/005* (2013.01); *G05D 1/0278* (2013.01); *G06V 20/188* (2022.01); *G06T 2207/20081* (2013.01); *G06T 2207/20084* (2013.01); *G06T 2207/30188* (2013.01)

(58) Field of Classification Search
CPC .............................. A01C 21/005; A01C 21/00
See application file for complete search history.

(56) References Cited

U.S. PATENT DOCUMENTS

| | | | |
|---|---|---|---|
| 6,999,877 B1 | 2/2006 | Dyer et al. | |
| 7,184,892 B1 | 2/2007 | Dyer et al. | |
| 10,912,251 B2 | 2/2021 | Pickett et al. | |
| 11,202,404 B2 | 12/2021 | Walter et al. | |
| 11,229,152 B2 | 1/2022 | Connell | |
| 2014/0012732 A1* | 1/2014 | Lindores | A01B 79/005 |
| | | | 705/37 |
| 2018/0168094 A1* | 6/2018 | Koch | A01C 5/064 |
| 2020/0034759 A1* | 1/2020 | Dumstorff | G06Q 50/02 |
| 2020/0042890 A1 | 2/2020 | Merrill et al. | |
| 2023/0048683 A1 | 2/2023 | Hubner et al. | |

FOREIGN PATENT DOCUMENTS

WO      WO 2022136182 A1      6/2022

OTHER PUBLICATIONS

Extended European Search Report and Written Opinion issued in European Patent Application No. 24157694.1 dated Aug. 27, 2024, in 10 pages.

* cited by examiner

*Primary Examiner* — Christopher D Hutchens

(57) ABSTRACT

In one embodiment, obtained moisture data, planting data, seeding rate and seeding depth, and planted seedbed/furrow quality (e.g., first through fourth data layers associated with select data spear zones distributed throughout the field to conserve data processing resources) are applied, inputted or transmitted wirelessly to a central server, with an electronic data processing device that is configured to estimate a yield of the crop at a row position basis throughout the field.

3 Claims, 13 Drawing Sheets

Input Device(s)

User Interface — 524

Crop Management Input
(E.G., Crop Management Sensors) — 526

Soil Characteristic Sensor — 528

Weather Sensor — 530

▽ Weather Data Receiver — 532

▽ Location-Determining Receiver — 534

Performance Sensor
(E.G., Yield Sensor) — 536

— 510

Data Storage Device

Historical Yield Data — 546

Yield Data — 548

Soil Data — 550

Weather Data — 552

— 514

Data Processor — 512

Evaluator — 537

Performance Estimator — 538

Mapper — 540

Data Analyzer — 542

Communications Port(s) — 518

Databus — 516

Display — 520

Weather Station — 522

Sensing Equipment — 537

▽ Transmitter — 538

FIG. 1

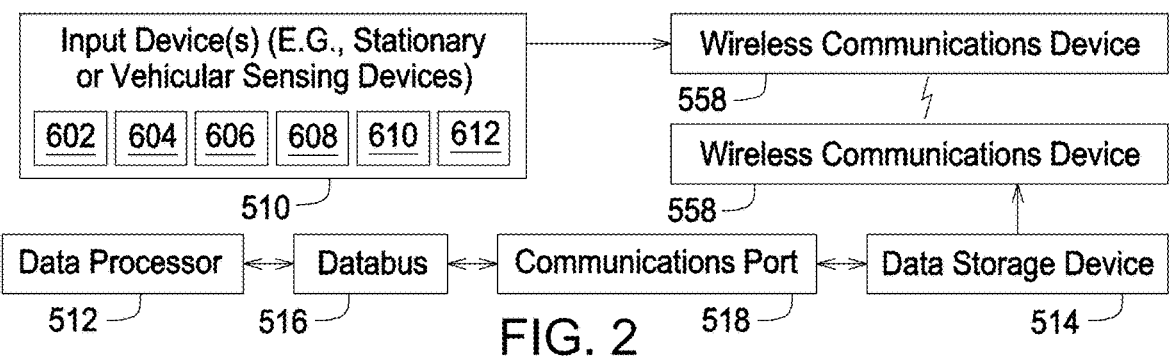

Input Device(s) (E.G., Stationary
or Vehicular Sensing Devices)

| 602 | 604 | 606 | 608 | 610 | 612 |

— 510

Wireless Communications Device

558

Wireless Communications Device

558

Data Processor — 512

Databus — 516

Communications Port — 518

Data Storage Device — 514

Figure 8:
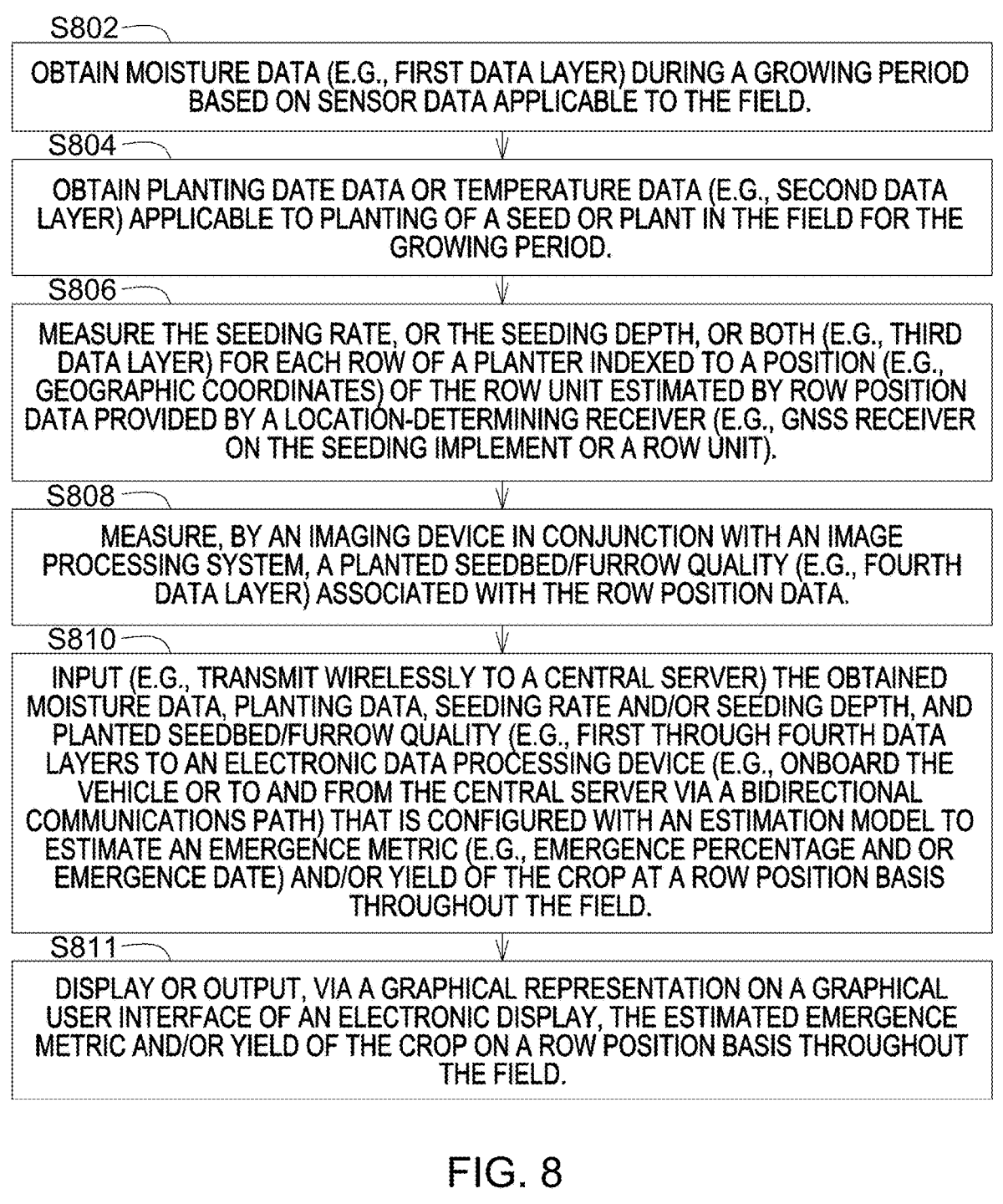

OBTAIN MOISTURE DATA (E.G., FIRST DATA LAYER) DURING A GROWING PERIOD BASED ON SENSOR DATA APPLICABLE TO THE FIELD.

S804

OBTAIN PLANTING DATE DATA OR TEMPERATURE DATA (E.G., SECOND DATA LAYER) APPLICABLE TO PLANTING OF A SEED OR PLANT IN THE FIELD FOR THE GROWING PERIOD.

S806

MEASURE THE SEEDING RATE, OR THE SEEDING DEPTH, OR BOTH (E.G., THIRD DATA LAYER) FOR EACH ROW OF A PLANTER INDEXED TO A POSITION (E.G., GEOGRAPHIC COORDINATES) OF THE ROW UNIT ESTIMATED BY ROW POSITION DATA PROVIDED BY A LOCATION-DETERMINING RECEIVER (E.G., GNSS RECEIVER ON THE SEEDING IMPLEMENT OR A ROW UNIT).

S808

MEASURE, BY AN IMAGING DEVICE IN CONJUNCTION WITH AN IMAGE PROCESSING SYSTEM, A PLANTED SEEDBED/FURROW QUALITY (E.G., FOURTH DATA LAYER) ASSOCIATED WITH THE ROW POSITION DATA.

S810

INPUT (E.G., TRANSMIT WIRELESSLY TO A CENTRAL SERVER) THE OBTAINED MOISTURE DATA, PLANTING DATA, SEEDING RATE AND/OR SEEDING DEPTH, AND PLANTED SEEDBED/FURROW QUALITY (E.G., FIRST THROUGH FOURTH DATA LAYERS TO AN ELECTRONIC DATA PROCESSING DEVICE (E.G., ONBOARD THE VEHICLE OR TO AND FROM THE CENTRAL SERVER VIA A BIDIRECTIONAL COMMUNICATIONS PATH) THAT IS CONFIGURED WITH AN ESTIMATION MODEL TO ESTIMATE AN EMERGENCE METRIC (E.G., EMERGENCE PERCENTAGE AND OR EMERGENCE DATE) AND/OR YIELD OF THE CROP AT A ROW POSITION BASIS THROUGHOUT THE FIELD.

S811

DISPLAY OR OUTPUT, VIA A GRAPHICAL REPRESENTATION ON A GRAPHICAL USER INTERFACE OF AN ELECTRONIC DISPLAY, THE ESTIMATED EMERGENCE METRIC AND/OR YIELD OF THE CROP ON A ROW POSITION BASIS THROUGHOUT THE FIELD.

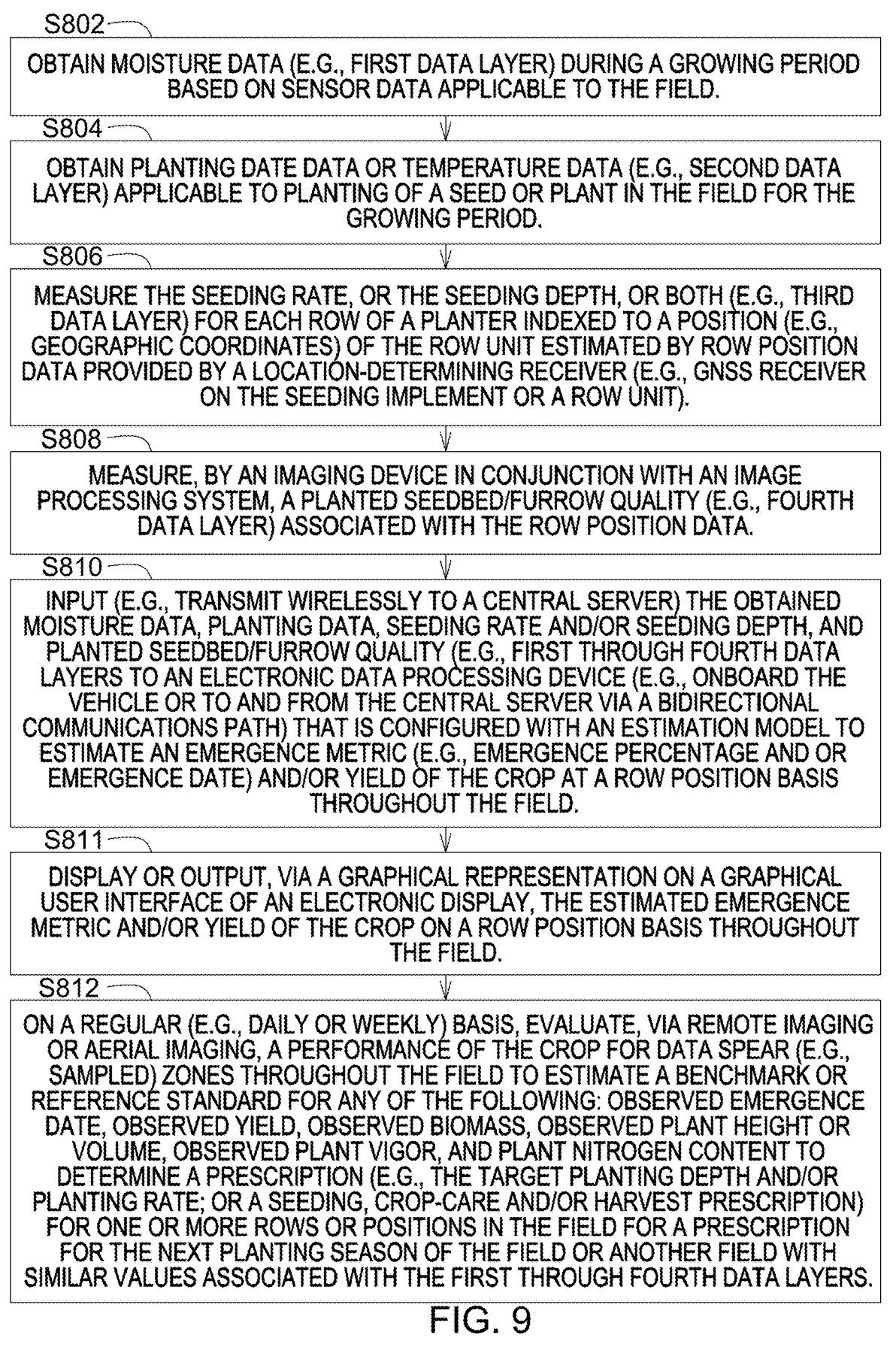

OBTAIN MOISTURE DATA (E.G., FIRST DATA LAYER) DURING A GROWING PERIOD BASED ON SENSOR DATA APPLICABLE TO THE FIELD.

S804

OBTAIN PLANTING DATE DATA OR TEMPERATURE DATA (E.G., SECOND DATA LAYER) APPLICABLE TO PLANTING OF A SEED OR PLANT IN THE FIELD FOR THE GROWING PERIOD.

S806

MEASURE THE SEEDING RATE, OR THE SEEDING DEPTH, OR BOTH (E.G., THIRD DATA LAYER) FOR EACH ROW OF A PLANTER INDEXED TO A POSITION (E.G., GEOGRAPHIC COORDINATES) OF THE ROW UNIT ESTIMATED BY ROW POSITION DATA PROVIDED BY A LOCATION-DETERMINING RECEIVER (E.G., GNSS RECEIVER ON THE SEEDING IMPLEMENT OR A ROW UNIT).

S808

MEASURE, BY AN IMAGING DEVICE IN CONJUNCTION WITH AN IMAGE PROCESSING SYSTEM, A PLANTED SEEDBED/FURROW QUALITY (E.G., FOURTH DATA LAYER) ASSOCIATED WITH THE ROW POSITION DATA.

S810

INPUT (E.G., TRANSMIT WIRELESSLY TO A CENTRAL SERVER) THE OBTAINED MOISTURE DATA, PLANTING DATA, SEEDING RATE AND/OR SEEDING DEPTH, AND PLANTED SEEDBED/FURROW QUALITY (E.G., FIRST THROUGH FOURTH DATA LAYERS TO AN ELECTRONIC DATA PROCESSING DEVICE (E.G., ONBOARD THE VEHICLE OR TO AND FROM THE CENTRAL SERVER VIA A BIDIRECTIONAL COMMUNICATIONS PATH) THAT IS CONFIGURED WITH AN ESTIMATION MODEL TO ESTIMATE AN EMERGENCE METRIC (E.G., EMERGENCE PERCENTAGE AND OR EMERGENCE DATE) AND/OR YIELD OF THE CROP AT A ROW POSITION BASIS THROUGHOUT THE FIELD.

S811

DISPLAY OR OUTPUT, VIA A GRAPHICAL REPRESENTATION ON A GRAPHICAL USER INTERFACE OF AN ELECTRONIC DISPLAY, THE ESTIMATED EMERGENCE METRIC AND/OR YIELD OF THE CROP ON A ROW POSITION BASIS THROUGHOUT THE FIELD.

S812

ON A REGULAR (E.G., DAILY OR WEEKLY) BASIS, EVALUATE, VIA REMOTE IMAGING OR AERIAL IMAGING, A PERFORMANCE OF THE CROP FOR DATA SPEAR (E.G., SAMPLED) ZONES THROUGHOUT THE FIELD TO ESTIMATE A BENCHMARK OR REFERENCE STANDARD FOR ANY OF THE FOLLOWING: OBSERVED EMERGENCE DATE, OBSERVED YIELD, OBSERVED BIOMASS, OBSERVED PLANT HEIGHT OR VOLUME, OBSERVED PLANT VIGOR, AND PLANT NITROGEN CONTENT TO DETERMINE A PRESCRIPTION (E.G., THE TARGET PLANTING DEPTH AND/OR PLANTING RATE; OR A SEEDING, CROP-CARE AND/OR HARVEST PRESCRIPTION) FOR ONE OR MORE ROWS OR POSITIONS IN THE FIELD FOR A PRESCRIPTION FOR THE NEXT PLANTING SEASON OF THE FIELD OR ANOTHER FIELD WITH SIMILAR VALUES ASSOCIATED WITH THE FIRST THROUGH FOURTH DATA LAYERS.

FIG. 9

METHOD AND SYSTEM FOR ESTIMATING PERFORMANCE FOR POSITION-SPECIFIC CONTROL OF AN AGRICULTURAL MACHINE

RELATED APPLICATION

This document (including the drawings) claims priority and the benefit of the filing date based on U.S. application No. 63/496,056, filed Apr. 14, 2023, under 35 U.S.C. § 119(e), where the provisional application is hereby incorporated by reference herein.

FIELD

This disclosure relates to a method and system for estimating performance (e.g., yield) for position-specific control of an agricultural machine.

BACKGROUND

In certain prior art, agronomic data on plants or crop is collected machines/drones/planes/satellites/operations center. If data is collected on a plant-by-plant level, the yield data or other collected performance data tends to exceed data processing budgets or data processing capacity. For reference, an acre of corn or maize can have about 35,000 plants. Each plant could be described by tens or hundreds of attributes. For wheat or soybeans, the plant population and data attributes lead to data sets that are five or ten times larger than for corn. Accordingly, there is need to support a method and system for estimating performance (e.g., yield) for position-specific control of an agricultural machine, without using big data processing resources.

SUMMARY

In accordance with one embodiment, a method for determining the yield of a crop in a field uses multiple layers of data to estimate yield or crop performance. Moisture data (e.g., first data layer) is obtained during a growing period based on sensor data applicable to the field. Planting date data (e.g., second data layer) is obtained and is applicable to planting of a seed or plant in the field for the growing period. A least one of the seeding rate and seeding depth (e.g., third data layer) is measured for each row of a planter indexed to a position (e.g., geographic coordinates) of the row unit estimated by row position data provided by a location-determining receiver (e.g., GNSS receiver on the seeding implement or a row unit). In conjunction with an image processing system, an image device is configured to measure a planted seedbed/furrow quality (e.g., fourth data layer) associated with the row position data. The obtained moisture data, planting data, seeding rate and seeding depth, and planted seedbed/furrow quality (e.g., first through fourth data layers associated with select data spear zones distributed throughout the field to conserve data processing resources) are applied, inputted or transmitted wirelessly to a central server, with an electronic data processing device that is configured to estimate a yield of the crop at a row position basis throughout the field (e.g., during the growing season or at harvest time).

BRIEF DESCRIPTION OF THE DRAWINGS

FIG. 1 is a block diagram of one embodiment of a system for estimating performance of an agricultural crop or plant for position-specific control of an agricultural machine.

FIG. 2 is a block diagram of sensing devices that wirelessly provide sensor data to a central server for estimating performance of an agricultural crop or plant for position-specific control of an agricultural machine.

FIG. 8 is a flow chart of one embodiment of a method for estimating performance of an agricultural crop or plant for position-specific control of an agricultural machine.

FIG. 9 is a flow chart of another embodiment of a method for estimating performance of an agricultural crop or plant for position-specific control of an agricultural machine.

DETAILED DESCRIPTION

Figure 3:
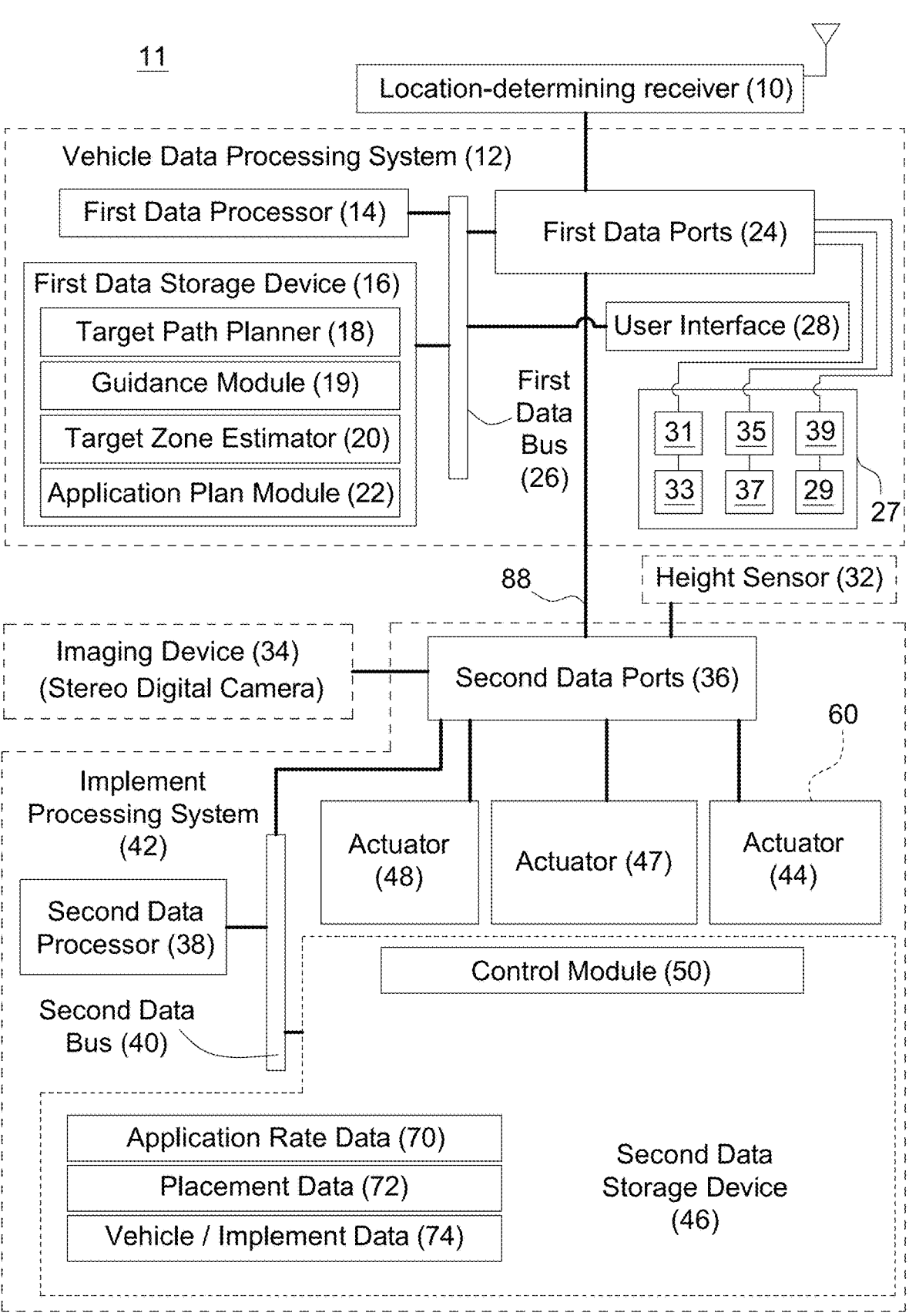
FIG. 3 is a block diagram of one embodiment of vehicle data processing system and an implement data processing system.

As used in this document, "adapted to" means programmed with software instructions, arranged to, or configured to perform a task, calculation, estimation, communication, or other function set forth in the document with a logic device, data processor or other electronic structure. Throughout this document, a reference to an "electronic data processor" or "data processor" may refer to any one or more of the following data processors in the drawings: data processor 512 of FIG. 1 and/or FIG. 2, first data processor 14 or second data processor 38 of FIG. 3, vehicle data processor 112 of FIG. 4, and implement data processor 150 of FIG. 4.

In accordance with one embodiment, a method for determining the yield of a crop in a field uses multiple layers of data to estimate yield or crop performance. Moisture data (e.g., first data layer) is obtained during a growing period based on sensor data applicable to the field. Planting date data (e.g . . . second data layer) is obtained and is applicable to planting of a seed or plant in the field for the growing period. A least one of the seeding rate and seeding depth (e.g., third data layer) is measured for each row of a planter indexed to a position (e.g., geographic coordinates) of the row unit estimated by row position data provided by a location-determining receiver (e.g., GNSS receiver on the seeding implement or a row unit). In conjunction with an image processing system, an image device is configured to measure a planted seedbed/furrow quality (e.g., fourth data layer) associated with the row position data. The obtained moisture data, planting data, seeding rate and seeding depth, and planted seedbed/furrow quality (e.g., first through fourth data layers associated with select data spear zones distributed throughout the field to conserve data processing resources) are applied, inputted or transmitted wirelessly to a central server, with an electronic data processing device that is configured to estimate a yield of the crop at a row position basis throughout the field.

In accordance with one embodiment of the invention, FIG. 1 shows a crop evaluation system. The crop evaluation system includes one or more input devices 510 that provide input data to a data processor 512. Each input device 510 may communicate to the data processor 512 via a communications port 518 and a data bus 516. A data bus 516 may support communications between or among one or more of the following components: the data processor 512, one or more input devices 510, the data storage device 514, the communications port 518, and the electronic display 520 (e.g., liquid crystal display or touchscreen display). A data storage device 514 may store input data inputted by any input device 510, processed data outputted by the data processor 512, or both. An electronic display 520 or another output device may be used to: (a) present a graphical or textual, tabular output of the crop evaluation system to a user, and/or (b) to provide, via a wireless communications channel, such as a pair of transceivers that operate over a communications network, a prescription (e.g., prescription data) to an electronic data processing system to control the operation of the agricultural machine or its implement, or its or their settings for a performing respective agricultural task.

In one embodiment, the input devices 510 comprise one or more of the following devices: a user interface 524 (e.g., a keyboard or keypad), a crop management input 526 (e.g., crop management sensors), a soil characteristic sensor 528, a weather sensor 530, a weather data receiver 532, a location-determining receiver 534 (e.g., a Global Positioning System (GPS) receiver with or without differential correction), and a performance sensor 536 (e.g., yield sensor). The user interface 524 may allow a user to manually enter input data via a graphical user interface 524, a keyboard and a pointing device, a floppy disk drive, a magnetic storage medium, an optical storage medium or otherwise. Accordingly, the user interface 524 may be used to input data that is gathered by information service providers, soil surveyors, climatic data-bases, weather databases, governmental records, meteorological records or other sources.

The soil characteristic sensor 528 may be any sensor that is capable of detecting at least one of the soil factors and sub-factors associated with the Soil Rating for Plant Growth (SRPG) soil factors or their equivalents, for example. The weather sensor 530 may detect air temperature, ground temperature, hours of sunlight, precipitation per unit time, and other weather or climatic information. The weather data receiver 532 may receive a weather data 552 feed from a regional, local or national weather service that provides weather data 552. The location-determining receiver 534 may be co-located with one or 30 more of the input devices 510 or sensors. For example, the location-determining receiver 534, the crop management input 526, the soil characteristic sensor 528, the weather sensor 530, and the performance sensor 536 may be mounted on a stationary sensing station or on a mobile 35 agricultural machine.

The data storage device 514 may be used to store input data collected by the input devices 510. For example, the data storage device 514 may store historical yield data 546, yield data 548, soil data 550, and weather data 552. The stored input data may be accessed by the data processor 512 to estimate current performance (e.g., yield) or other plant-related performance metrics based on previous or historical records.

The data processor 512 comprises an evaluator 537, a performance estimator 538, a mapper 540, and a data analyzer 542. The evaluator 537 is configured to evaluate, organize, process or model the stored input data in the data storage device 514 in accordance with one or more models such as an artificial intelligence (AI) model. The performance estimator 538 may estimate the current or prospective performance (e.g., average yield) of particular crop or variety of a particular crop in a defined geographic area based on historical yield data 546, soil data 550, climate data, and weather data 552 for the defined geographic area. The mapper 540 facilitates display or presentation by an electronic display 520 of the performance characteristic (e.g., average yield) of a particular crop in a defined geographic area in a graphical or tabular format for a user. The data analyzer 542 may use the crop evaluation provided by the performance estimator 538 to facilitate a business, marketing, or agronomic decision based on the crop evaluation.

In the field, a sensor station (e.g., weather station) comprises weather sensing equipment for gathering weather data 552, soil data 550, and temperature data for a certain geographic location and a transmitter 556 for transmitting the weather data 552 and location data to a weather data receiver 532 associated with the input devices 510.

In one embodiment, the input devices 510 comprise sensing devices for obtaining environmental measurements corresponding to test sites within a geographic region. For example, a sensing device may have one or more sensors, such as digital imaging devices or cameras that collect images within the visible light spectrum, infrared light spectrum, near-infrared light spectrum and/or ultraviolet light spectrum, for analyzing an environment of a plant or crop. Sensing devices may be disbursed throughout a field, mounted on a mobile agricultural machines, mounted on drones, balloons, or satellites. The environmental measurements may be associated with corresponding geographic locations or with a defined geographic area. Each environmental measurement includes at least one of soil data 550, weather data 552, and climate data. For instance, in some embodiments, weather data 552 may include rainfall data, whereas climate data 544 may include growing degree days (GDD) data. Soil data 550 may be referenced to, or expressed in terms of, soil indices or standard characteristics of components or constituents (e.g., mineral content, nutrient availability, nutrient content, salinity, organic matter content, water holding capacity, clay, sand, silt, loam).

The crop inputs are measured for crop production and may be gathered by sensors associated with the agricultural equipment. The crop inputs may include one or more of the following: planting rate, fertility, planting date or row width, and may associated those variables with yield.

A performance estimator 538 determines an estimated performance for a crop planted in the geographic region based on the obtained environmental measurements. For example, the performance estimator 538 comprises a yield estimator for determining an average yield (e.g., bushels per acre) of the particular crop in a defined geographic area.

An evaluator 537 establishes contours of one or more areas with generally uniform performance level (e.g., generally uniform average yields) within the geographic region by applying data analysis, such as an artificial intelligence model, to the obtained environmental measurements. The evaluator 537 applies a data analysis, such as an artificial intelligence model, to determine critical environmental measurements associated with corresponding generally uniform performance ranges (e.g., generally uniform average yields) for the particular crop.

The mapper 540 facilitates the provision of a graphical representation or tabular, textual representation of the environmental measurements or data analysis for improved understanding. The mapper 540 may support assigning different colors or different shades to different geographic areas having distinct performance levels (e.g., average yields of a particular crop or variety of a particular crop). Further, the mapper 540 may support printing of a map or recording of a database file of performance levels by geographic location or provision of a database of locations, grower identifiers, and performance levels for particular varieties of crops.

In an alternate embodiment, the mapper 540 is configured to provide a seeding prescription, a growing prescription and/or a harvesting prescription on at the level of the field, zone, row, row section or plant or cluster or block of plants.

The data analyzer 542 may be used to identify effective crop inputs and effective management techniques for improving the production of agricultural products. For example, the production of agricultural products may be conducted more economically, in less time, with greater yield or with a greater yield of defined plant characteristics.

The performance estimator 538 may estimate the current or prospective performance (e.g., average yield) of particular crop or variety of a particular crop in a defined geographic area based on historical yield data 546, soil data 550, climate data 544, and weather data 552 for the defined geographic area. The mapper 540 facilitates display 520 of the performance characteristic (e.g., average yield) or other performance metric of a particular crop in a defined geographic area in a graphical or tabular format for a user.

FIG. 2 shows a block diagram of another embodiment of a crop evaluation system that comprises a set of sensors (602, 604, 606, 608, 610, 612) on an agricultural machine, implement or a stationary sensor station. For example, the sensors comprise one or more of the following: (a) a soil moisture sensor 602 associated with ground engaging member of a planter, row unit or implement; (b) a clock 604 with a time and date stamp associated with the data processor 512 for tracking the planting date data and/or elapsed time from the planting date; (c) a seeding rate sensor 606 or seeding meter associated with each row unit of a planter or implement; (d) a seeding depth sensor 608 associated with each row unit of a planter or implement; (e) an image processing system 610 or imaging device 612 configured to measure a seedbed quality, a furrow quality, or both.

The crop evaluation system of FIG. 2 is similar to the crop evaluation system of FIG. 1, except the crop evaluation system of FIG. 2 includes wireless communications devices 558 to support communications between one or more input devices 510 and a data processor 512. Wireless communications devices 558 may comprise radio frequency transceivers, a pair of transmitters 556 and a receiver, or other suitable electronics equipment, alone or together with a wireless communications system (e.g., cellular communications system) or base station. Like reference numbers in FIG. 1 and FIG. 2 indicate like elements.

FIG. 3 is a block diagram of one embodiment of a system 11 for planting seeds or for spraying plants. In one embodiment, the system 11 comprises a vehicle data processing system 12 and an implement data processing system 42. The vehicle data processing system 12 of FIG. 3 comprises a first (electronic) data processor 14, a first data storage device 16, first data ports 24 and a user interface 28 coupled to a first data bus 26. The first data processor 14, the first data storage device 16, the data ports 24, and the user interface 28 can communicate with each other via the first data bus 26.

In one embodiment, a location-determining receiver 10 (e.g., Global Positioning System receiver with differential correction, or a Global Navigation Satellite System receiver with real-time kinetic correction data, precise point positioning (PPP) correction data, or other differential correction data) is coupled to at least one of the first data ports 24. A vehicle control system 27 is coupled to the first data ports 24 or the first data bus 26. For example, a steering controller 31, braking controller 35, and propulsion controller 39 may be coupled, directly to the first data ports 24, or indirectly to the vehicle data processing system 12 (or to the data ports) via a vehicle data bus 26. In turn, the steering controller 31 is connected to the steering system 33; the braking controller 35 is connected to the braking system 37; the propulsion controller 39 is connected to the propulsion system 29.

In one embodiment, the implement data processing system 42 comprises a second (electronic) data processor 38, a second data storage device 46, and second data ports 36 coupled to a second data bus 40. The second data processor 38, the second data storage device 46, and the second data ports 36 can communicate with each other via the second data bus 40. In one embodiment, a distance sensor (e.g., range sensor) and an optional crop height sensor 32 are coupled to the second data ports 36. In another embodiment, an optional imaging device 34 (e.g., stereo digital camera) is coupled to the second data ports 36. The optional crop height sensor 32 and the optional imaging device 34 are shown in dashed lines to indicate one or both are optional and may be deleted from certain configurations. In some configurations, the first data ports 24 and the second data ports 36 can communicate with each other via a communications line 88 or shared memory, for example.

The first data processor 14, the second data processor 38 or both comprise a microcontroller, a microprocessor, a digital signal processor (DSP), a programmable logic array, a field programable gate array (FPGA), a system on a chip (SOC), a logic device, an arithmetic logic unit, an application specific integrated circuit (ASIC), a multi-core data processing system, or another electronic processing device for inputting, outputting, processing or manipulating data.

The first data storage device 16, the second data storage device 46, or both comprises electronic memory, nonvolatile random-access memory, an optical disc, an optical storage device, a magnetic disc, a magnetic storage device, a hard drive or another mechanism for storing, accessing and retrieving data. In one embodiment, first data storage device 16 stores a target path planner 18 and guidance module 19, a target zone estimator 20 and an application plan module 22. Each module may comprise software, electronic hardware, or both.

The target path planner 18 provides a path plan for the vehicle 61 or implement (e.g., cultivator, sprayer, planter) to following in a field, such as a plan to make passes or swaths in the field to cover an enter field area with minimum overlap of worked soil, crop inputs or sprayed materials. For example, the target path planner 18 may establish a path plan for the vehicle to follow with a location-determining receiver 10 and a vehicle guidance module 19. The vehicle guidance module 19 can send command data or command signals to the steering controller 31, the braking controller 35, and the propulsion controller 39 via one or more data ports 24 or via the vehicle data bus such that the vehicle 61 tracks a path plan.

In one embodiment, a steering controller 31, a braking controller 35 and propulsion controller 39 communicate to the first data ports 24 via communication lines or a vehicle data bus, such as controller area network (CAN) data bus. In turn, the steering controller 31 communicates with the steering system 33, such as an electrohydraulic steering system 33 or an electrical steering system 33. The vehicle guidance module 19 generates command data or command signals to send steering commands to the steering controller 31 to track the path plan, target heading or target yaw, such as: (a) for a sprayer, a target path where one or more nozzle assemblies are substantially centered between adjacent plant rows or plant row segments, or (b) for a planter, a target path has one or more row units (e.g., each with an opener and closing wheel) aligned with a future plant row, respective furrow or seedbed row. The vehicle guidance module 19 may use position data form the location-determining receiver 10 or the optional imaging device 34, or both.

The braking controller 35 is coupled to a braking system 37, such as an electrohydraulic braking system 37, an electrical braking system 37 or a mechanical braking system 37. The braking controller 35 is coupled to a first data port.

The propulsion controller 39 is coupled to a propulsion unit, such as one more electric drive motors, an internal combustion engine, or an internal combustion engine that provides rotational mechanical energy to a generator or an alternator that provides electrical energy to one or more electric drive motors. The propulsion controller 39 is coupled to a first data port 24.

In one embodiment, a target zone estimator 20 estimates a target zone for applying crop inputs or treatments for application to plants, plant rows, plant row segments, soil zones, or soil. For example, crop inputs comprise any of the follow items: seed(s), plant(s), rootstock, rhizomes, insecticides, herbicides, fungicides, pesticides, chemicals, nutrients, nitrogen, phosphorus, potash, chemicals, or aqueous solutions for applying to treat plants or the soil. Each target zone may be associated with a corresponding waypoint, a range of waypoints, a path segment, a point or geographic location, such as a plant or plant row segment, along the path plan of the sprayer or vehicle In one embodiment, the target zone estimator 20 determines or implements the zones, concentration, and amount of crop inputs applied for each corresponding waypoint, point or geographic location along the path plan of the sprayer, planter, or vehicle 61, which in turn may determine the number of nozzles of a nozzle assembly 60 that are activated on the boom and the positions or sections of nozzles that are activated on the boom by nozzle actuators (44, 47, 48).

In one configuration, the target zone estimator 20 can select or control an actuator (44, 47, 48) of: (a) one or more row units of a planter to dispense seed with a corresponding metered rate, a corresponding seed depth, a corresponding downforce or with a (variable) target seed population, and/or (b) one or more nozzles (e.g., in a vertical array of nozzles or a nozzle assembly) that are generally parallel to each plant row (e.g., a geometric centerline of each plant row or center point) to direct or apply the crop inputs toward a selected one of the several strips, for a corresponding segment of each plant row. As used in this document, a nozzle assembly shall be synonymous with a nozzle head. In one embodiment, the nozzle assembly can provide a target first zone, second zone and third zone based on whether the row unit is centered between adjacent plant row segments and the lateral row spacing (or row width) between adjacent plant row segments. In a first example, even if the lateral row spacing or row width varies or if the nozzle assembly is laterally offset from a center point between the adjacent rows, the nozzle assembly can compensate by activating, separately or collectively, different actuators (44, 47, 48) for nozzles in each vertical array to target different zones on each side or opposite sides of the nozzle assembly. In a second example, the target zone estimator 20 or the control module 50 activates nozzles of the nozzle assembly directed toward the first zone for a corresponding narrow width row, a second zone for a corresponding medium width row, and a third zone for a corresponding wide width row, where the narrow width row has less distance between adjacent row segments than the medium width row or the wide width row.

In one embodiment, the application plan module 22 estimates the crop inputs that are applied for a certain field along with a lateral distance or offset between a nozzle assembly 60 or nozzle and one or more plant rows. The PPP module may estimate the lateral position of the sprayer or wheels based on the position data from the location-determining receiver 10 or distance data from one or more distance sensors associated with the row unit to provide a distance estimate between the plant row (e.g., plant row segment) and the row unit or nozzle assembly. In one embodiment, the control module 50 can decide which nozzle in a vertical array of nozzles to activate for a row unit for any given waypoint, plant or section of plants in a row. Each nozzle assembly and its actuators (44, 47, 48) or any optional data processor or controller) can communicate with the second data processor 38 via cable (e.g., wiring or communications line and power line) and one or more second data portions 36.

In conjunction with the location-determining receiver 10, the imaging device 34, and the plant proximity processing (PPP) module may estimate the distance between one or more nozzles (of the nozzle assembly) and a corresponding row or rows of plants. The PPP module may comprise a lateral position estimator that can estimate whether a lateral position of the sprayer or its wheels, or tracks or centered in a plant row or offset with respect to the center of the plant row to provide more concentrated application of crop input to certain area of foliage or a strip of ground relative to the row of plants.

In one embodiment, the distance sensor may comprise an ultrasonic range finder, a laser range detector, an optical sensor that sends an ultrasonic signal, laser signal or optical signal, respectively, toward a plant row, a plant, a stalk, stem or trunk, a leaf canopy, or foliage to estimate or measure a lateral distance between a reference point on the boom or sprayer to the plant row, plant, leaf canopy, or foliage. For example, a laser range finder may comprise a light detection and ranging (LIDAR) device. In one embodiment, the reference point may be aligned with a opener of row unit of a planter, or a reference nozzle or nozzle assembly of a sprayer. In an alternate embodiment, the distance sensor may comprise a stereo imaging device.

Figure 4:
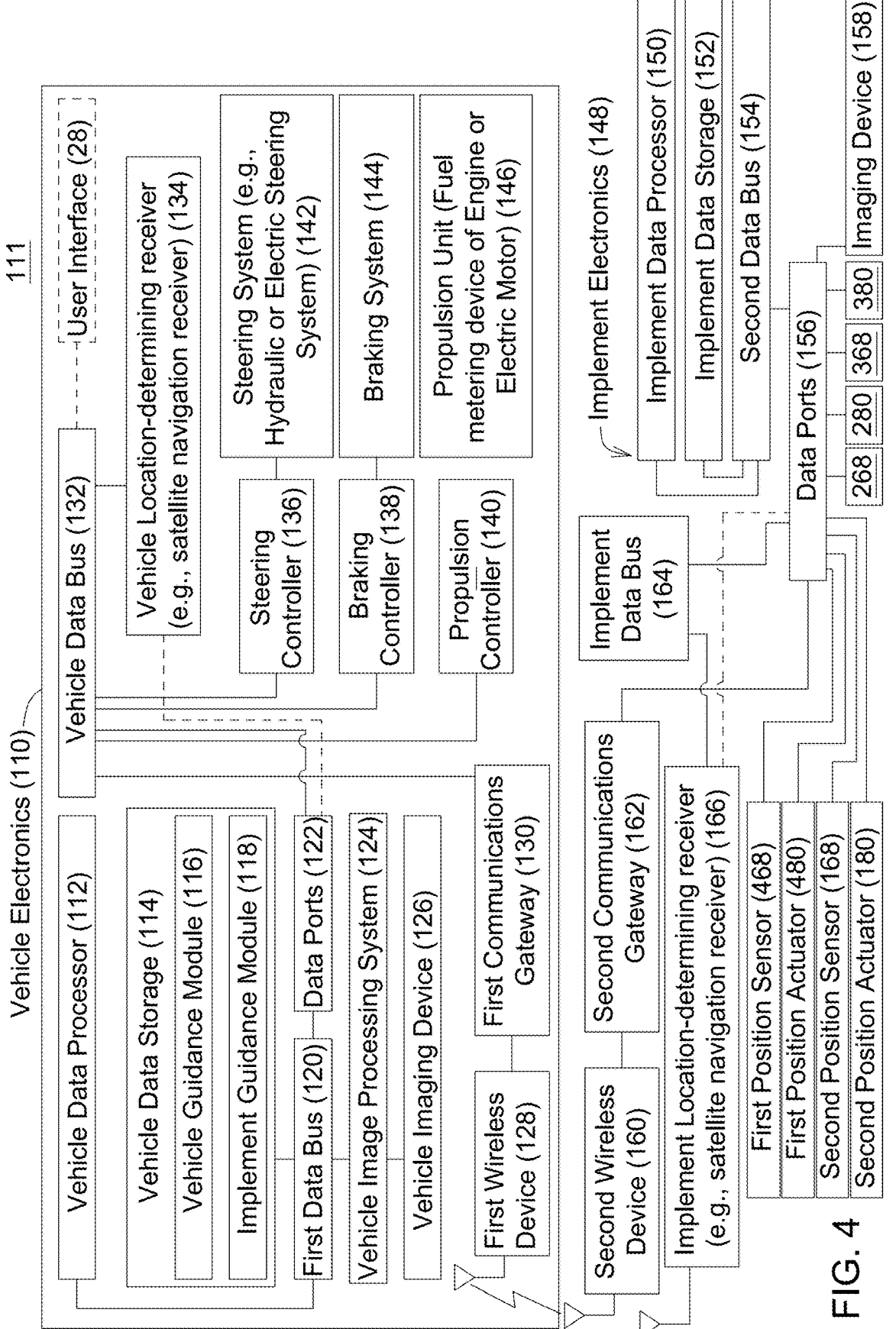
FIG. 4 is a block diagram of another embodiment of vehicle data processing system and an implement data processing system.

FIG. 4 is one embodiment of a block diagram of control system 111 associated with a ground-engaging implement (e.g., planter), implement electronics 148, and vehicle electronics 110 that support down-force and/or depth adjustment.

The control system 111 comprises vehicle electronics 110 and implement electronics 148. In one embodiment, the vehicle electronics 110 comprises a vehicle data processor 112, vehicle data storage 114, data ports 122, and a vehicle image processing system 124 that can communicate with each other via first data bus 120. In one embodiment, the vehicle image processing system 124 is coupled to a vehicle imaging device 126 that can provide collected image data (e.g., stereo image data) to the vehicle image processing system 124.

The vehicle data processor 112 may comprise a microprocessor, a microcontroller, a programmable logic array, digital signal processor, an application specific integrated circuit, a logic circuit, an arithmetic logic unit, or another electronic data processing unit.

The vehicle data storage device 114 comprises electronic memory, nonvolatile random access memory, an optical storage device, a magnetic storage device, a magnetic hard drive, a magnetic tape, or another device for storing digital data.

In one embodiment, the vehicle data storage device 114 stores one or more of the following modules, such as software modules: vehicle guidance module 116 and implement guidance module 118.

A vehicle location-determining receiver 134 may comprise a satellite navigation receiver, such as a satellite navigation receiver or Global Positioning System (GPS) receiver with differential correction receiver for receiving a differential correction signal from reference stations or for receiving a precise point positioning (PPP) correction signal, for example. The vehicle-location determining receiver 134 may communicate directly with the data port 122 of the vehicle control system 111 or via the vehicle data bus 132. In one embodiment, the vehicle electronics 110 comprises a steering controller 136, a braking controller 138, and a propulsion controller 140 that can communicate via the vehicle data bus 132. In turn, the steering controller 136 is coupled to the steering system 142; the braking controller 138 is coupled to the braking system 144; the propulsion controller 140 is coupled to the propulsion unit 146.

In one embodiment, the steering system 142 comprises an electrohydraulic steering system or electric steering system, where the electrohydraulic steering system comprises a solenoid that controls the valve of a hydraulic steering system and where the electric steering system comprises an electric motor that drives a rack and pinion gear or another mechanical steering linkage. The braking system 144 may comprise an electrohydraulic braking system, a cable braking system, or mechanical braking system. The propulsion unit 146 comprises an engine, an electric motor, or the fuel metering device that is used in conjunction with an internal combustion engine.

In one embodiment, the first communications gateway 130 can communicate to the vehicle data bus 132 and provides security layer between the first wireless device 128 and vehicle data bus 132 or vehicle electronics 110. Further, the first communications gateway 130 provides buffer memory for storing communications between the vehicle electronics 110 and the implement electronics 148.

The implement electronics 148 comprises an implement data processor 150, implement guidance module 118 (e.g., in the vehicle electronics 110), implement data storage 152, and data ports 156 that can communicate with each other via the second data bus 154. At the implement (e.g., planter or seeding machine) 710 or on the an optional imaging device (158 or 726) is coupled to the data ports 156.

In one embodiment, the first position sensor 468, second position sensor 168, third position sensor 268, and fourth position sensor 368 are coupled to the implement data bus 164 or the data ports 156. Similarly, in one embodiment, the first actuator 480, the second actuator 180, the third actuator 280 and fourth actuator 380 are coupled to the implement data bus 164 or the data ports 156. Each position sensor (468, 168, 268, 368) may comprise a rotary position sensor; a magnet and magnetic field sensor (e.g., Hall-effect sensor); or potentiometer. Each actuator (480, 180, 280, 380) may comprise a hydraulic cylinder, a linear actuator, a linear motor, an electric motor with a screw gear or rack and pinion gear, or the like.

In one embodiment, the first position sensor 468 may comprise an angle sensor, an optical sensor, a magnetic field sensor and an associated magnet, a potentiometer, a rotary potentiometer, or another sensor for measuring an angle between any first pivotable arm proportional to, trigonometrically scaled to, or indicative of a planting depth of a respective first row unit of planter. In one embodiment, the second position sensor 168 may comprise an angle sensor, an optical sensor, a magnetic field sensor and an associated magnet, a potentiometer, a rotary potentiometer, or another sensor for measuring a second angle between any first pivotable arm proportional to, trigonometrically scaled to, or indicative of a planting depth of a respective second row unit of planter.

An implement location-determining receiver 166 may comprise a satellite navigation receiver, such as a satellite receiver with differential correction receiver for receiving a differential correction signal from reference stations or for receiving a PPP correction signal. The implement location-determining receiver 166 may communicate directly with the data port 156 of the implement electronics 148 or data processing system or via the implement data bus 164.

In one embodiment, the second communications gateway 162 can communicate to the implement data bus 164 and provides security layer between the second wireless device 160 and second data bus 154 or implement electronics 148. Further, the second communications gateway 162 provides buffer memory for storing communications between the vehicle electronics 110 and the implement electronics 148.

Figure 5A:
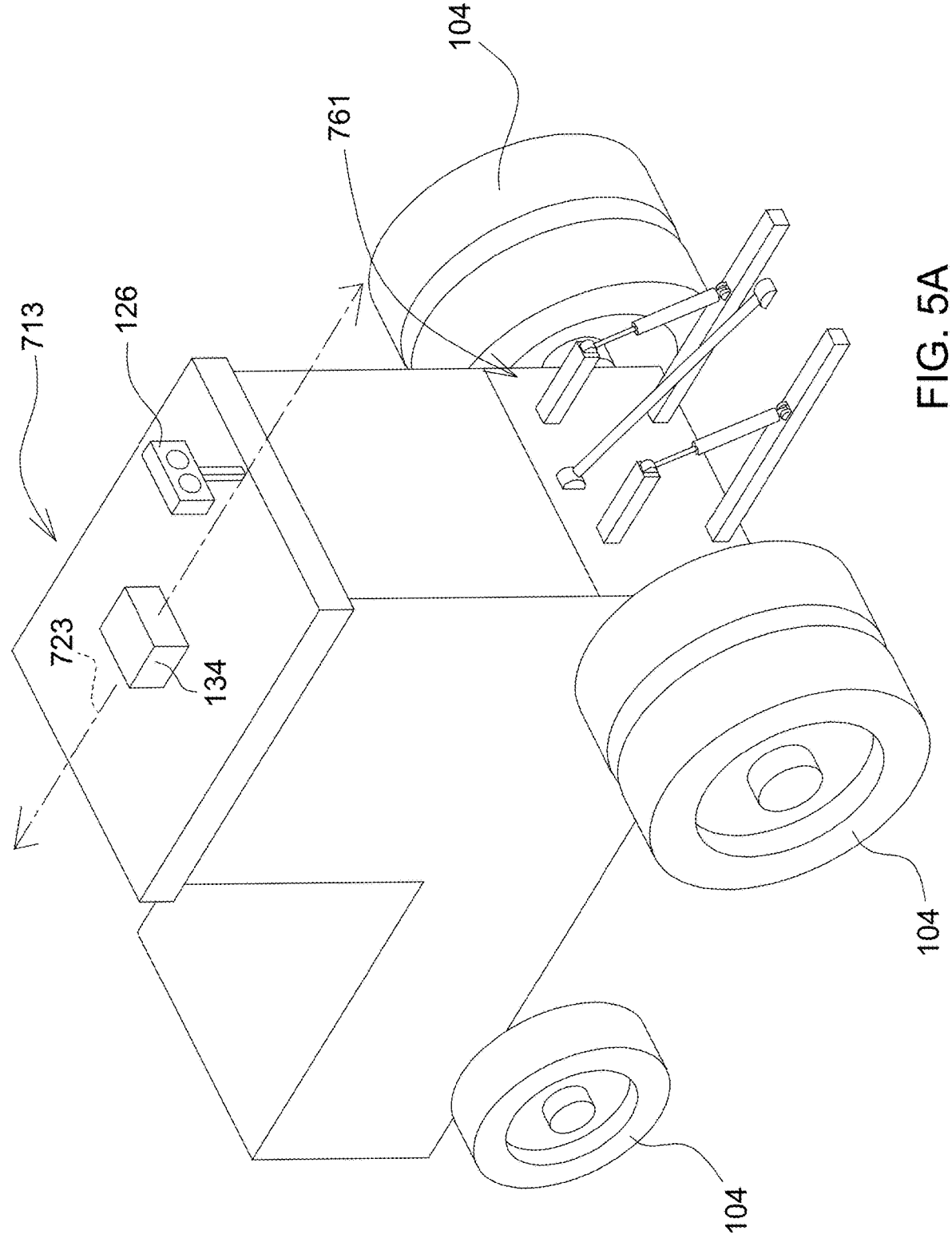
FIG. 5A shows a perspective view of one embodiment of a vehicle configured with one or more sensors for collecting image data of a field, plant or crop.

FIG. 5A is perspective rear view of a vehicle 713 (e.g., agricultural machine) for towing one embodiment of a ground-engaging implement (e.g., planter or seeding implement 710) via a hitch 761 (e.g., three-point hitch) to apply or distribute seeds, plants or other crop inputs with respect to one or more plant rows, seed beds, drip tape, irrigation lines, reference lines, guidance lines or guidance curves. The lateral axis is substantially perpendicular to the vehicle longitudinal axis 723 of the vehicle 713, the implement longitudinal axis of the implement 710, or both. Although the vehicle 713 has wheels 104 with tires, the wheels may be replaced with ground-engaging tracks.

Figure 5B:
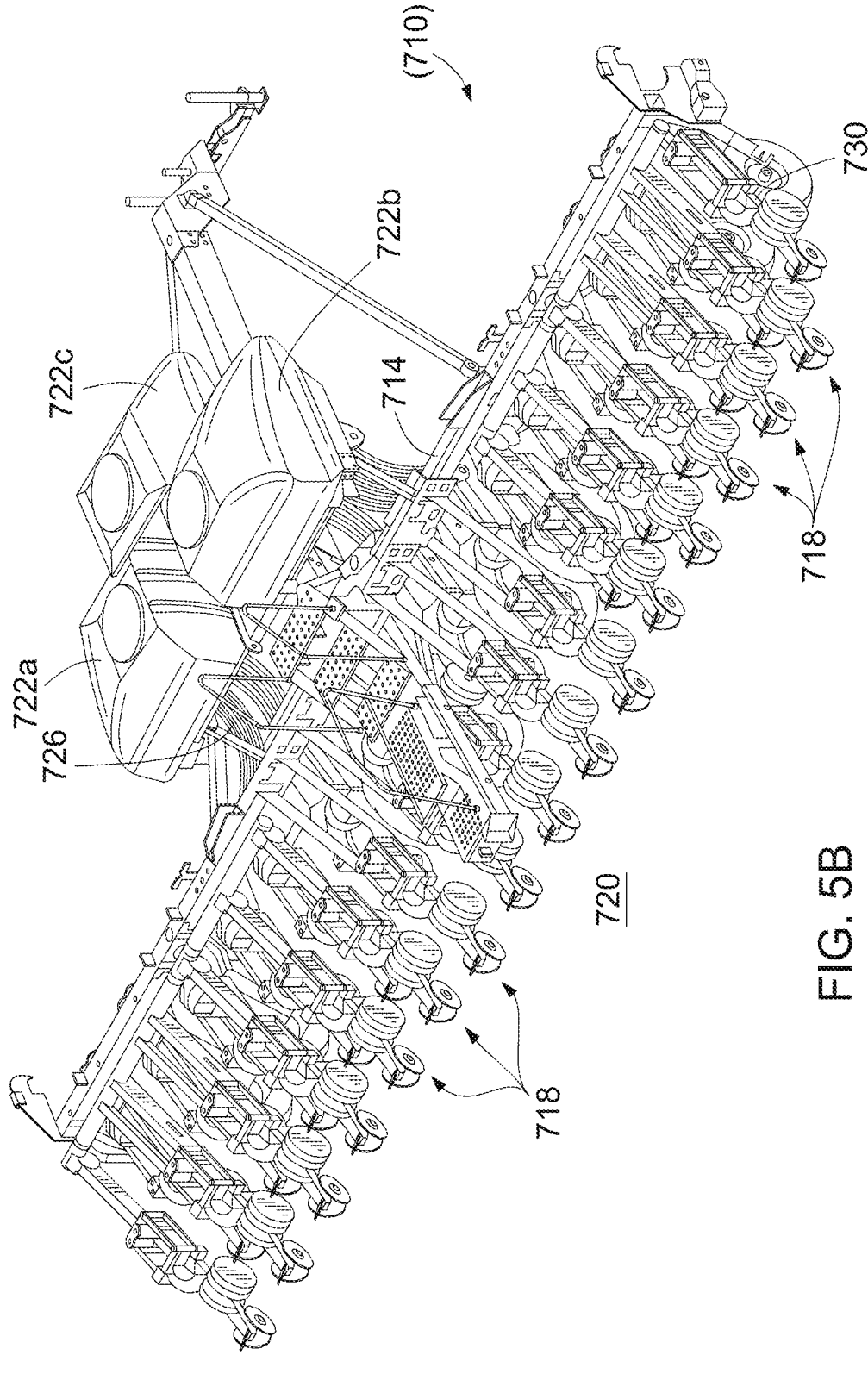
FIG. 5B illustrates a perspective view of one embodiment of a planter that is configured to support an adjustable down-force setting and/or an adjustable planting depth.

FIG. 5B illustrates an implement, such as a planter or seeding machine 710 (e.g., a row crop planter). The seeding machine 710 includes a main frame 714. A plurality of individual row units 718 (e.g., to establish seedbed rows and as-planted seed rows) are coupled (e.g., mounted) on a rear portion of the main frame 714 such that the row units 718 are pulled over or across a layer of soil 720. Alternatively, the row units 718 may be positioned forward of the frame 714 and are pushed over or across the soil layer 720, or the machine may have a combination of push and pull row units 718. Seed sources, such as storage tanks 722a-722c, are coupled to the main frame 714 and hold seed that is delivered, e.g., pneumatically or in any other suitable manner, to a mini-hopper (not shown) associated with each row unit 718. The storage tanks 722a-722c are coupled to the mini-hoppers by way of conduits or tubes 726, such as hoses, and a pressurized delivery apparatus (not shown). Each storage tank 722a-722c contains the same or different varieties of seed to be planted in the soil 720. Each row unit 718 is connected to a conduit 726 such that each row unit 718 is coupled to a storage tank 722a-722c to receive seed. As illustrated by way of example only in FIG. 5B, each row unit 718 further includes its own sub-frame 730, to which various components (e.g., a furrow opener, a furrow closer, or the like) are mounted.

Figure 6:
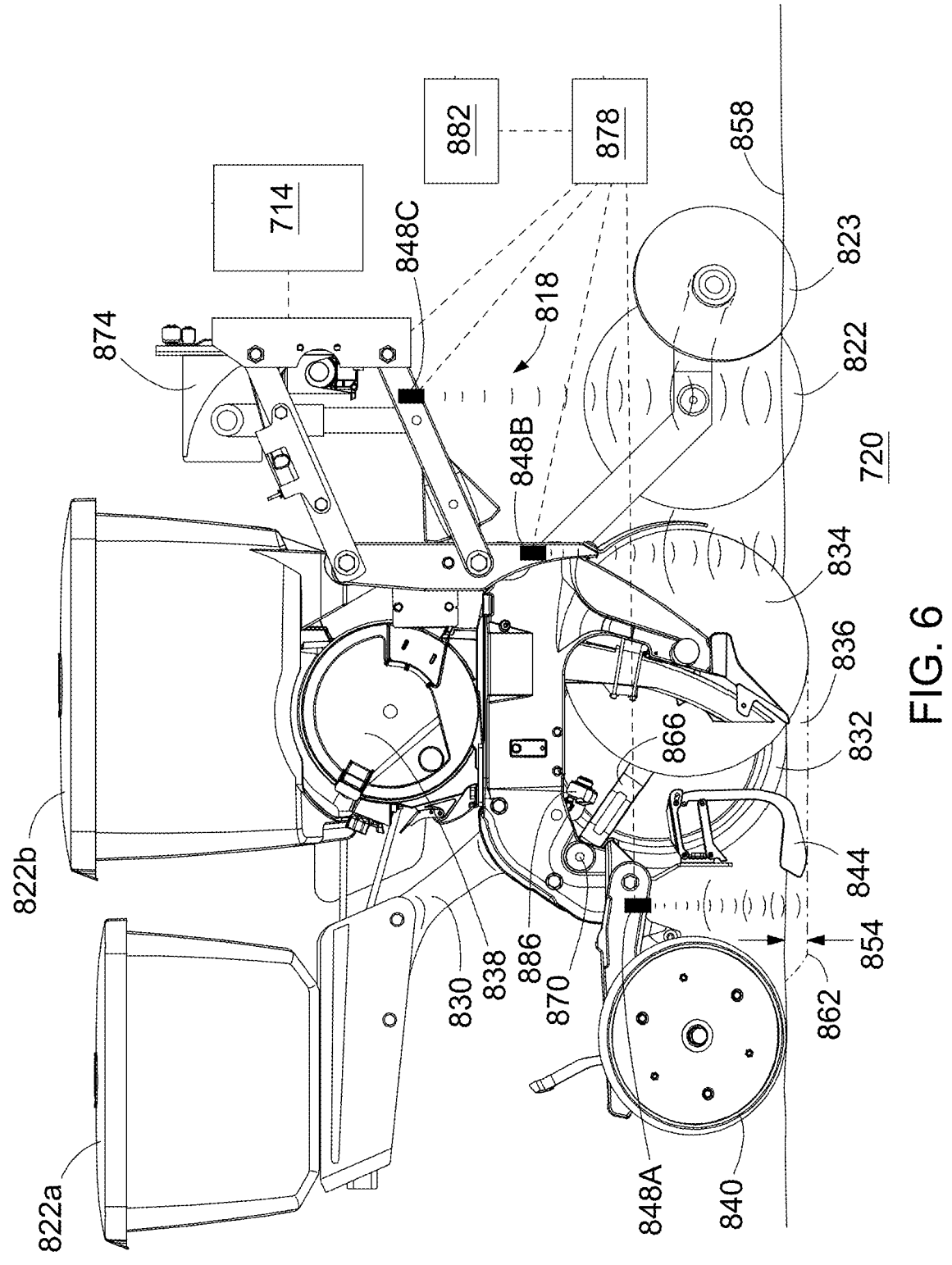
FIG. 6 is one embodiment an illustrative row unit of a planter that is configured to support an adjustable down-force setting and/or an adjustable planting depth.

FIG. 6 illustrates an example of a row unit 818 that may be used in place of any one of the row units 718 in FIG. 5B. Similar to the row unit 718, the row unit 818 is also coupled to the main frame 714. In some constructions, a plurality of row units 818 are coupled to the main frame 714, similar to the row units 718 in FIG. 5B. As illustrated in FIG. 6, each row unit 818 includes hoppers 822a, 822b, which hold chemical and seed, respectively (as opposed to the row unit 718 receiving seed from bulk storage (722a, 722b, and 722c) as in the configuration illustrated in FIG. 5B). The hoppers 822a, 822b are coupled to a row unit sub-frame 830. Each row unit 818 also includes a gauge wheel or wheels 832 coupled to the row unit sub-frame 830. The gauge wheel 832 contacts and rolls along the soil 720, and a furrow opener 834 (e.g., an opening wheel or blade or other structure having a stationary or rotating surface that contacts and moves soil away to form a furrow) is coupled to the row unit sub-frame 830 for forming a furrow 836 (illustrated schematically) in the soil 720. A seed metering device 838 coupled to the row unit sub-frame 830 receives seeds from the hopper 822b and meters and dispenses the seeds into the furrow 836. A furrow closer 840 (e.g., a closing and packing wheel or wheels or other structure having a stationary or rotating surface that contacts and presses soil 720) coupled to the row unit sub-frame 830 pushes soil around the seeds to close the furrow 836. Each row unit 818 may also include a seed firmer 844 (e.g. an angled arm as illustrated in FIG. 6, a press wheel coupled to a press wheel arm, or other structure that firms a seed) coupled to the row unit sub-frame 830 that firms each seed and pushes it into the open furrow 836 to ensure good seed to soil contact before the furrow 836 is closed. FIG. 6 also illustrates an optional coulter wheel 822 and row cleaner 823 forward of the furrow opener 834.

The row unit 818 also includes a downforce adjustment mechanism 874 coupled to the main frame 714 and to the row unit sub-frame 830. The downforce adjustment mechanism 874 includes springs, pneumatics, hydraulics, linkages, and/or other structures such that when the downforce adjustment mechanism is activated, the downforce adjustment mechanism 874 pushes the row unit sub-frame 830 of the row unit 818 and consequently the furrow opener 834 into the soil 720 to dig the furrow 836. The gauge wheels 832, however, continue to ride along the top surface 858 of the soil 720. A depth 854 of the furrow 836 is measured from a top surface 858 of the soil 720 to the bottom 862 of the furrow 836, along a direction that is perpendicular to the top surface 858 (assuming a flat, non-inclined top surface 858), and therefore depends on a position of the gauge wheels 832 relative to the furrow opener 834. In some configurations, the depth 854 is equivalent to a distance between a bottom of the gauge wheel or wheels 832 and a bottom of the furrow opener 834.

With continued reference to FIG. 6, the gauge wheel(s) 832 are coupled to the sub-frame 830 with respective arms 866 and respective pivots 870. Stops 886 are also provided for each gauge wheel arm 866 to limit the upward rotation of each gauge wheel arm 866. The stops 886 are adjustable to a desired position to set the depth 854 of the furrow 836. The position of the stops 886 may be manually adjusted, adjusted by an actuator (e.g., 480, 180, 380, 280; or 44, 47, 48) (e.g., linear actuator, electric motor with a mechanical screw) or a remote adjustment assembly may be included such as shown in U.S. Pat. No. 4,413,685, the entire contents of which are incorporated herein by reference. However, during operating conditions the gauge wheel arms 866 may not always be contacting the stops 886, and thus the actual depth 854 may not be determined solely by knowing the position of the stops 886. Additionally, the furrow opener 834 can wear during use, altering the actual depth 854. Thus, relying on the stops 886 alone may not necessarily be sufficient to determine the actual depth 854 of the furrow 836 at any given time.

Each row unit 818 also includes at least one ground view sensor 848A, such as a laser range finder or ultrasonic distance sensor, a camera, or an imaging device, which may comprise first position sensor 468, second position sensor 168, third position sensor 268 or fourth position sensor 368) operable to view toward and directly detect a surface of the ground. The illustrated ground view sensor 848A is operable to view into the furrow 836. The ground view sensor 848A is supported directly or indirectly by the sub-frame 830. The ground view sensor 848A may operate alone or with one or more additional ground view sensors (not shown) over the furrow 836 to view into and directly detect the furrow 836 (e.g., at the furrow bottom 862) and generate depth signals corresponding to an actual direct measurement of a depth 854 of the furrow 836. As mentioned herein, knowledge of the position of the gauge wheels 832 can yield a value corresponding to furrow depth 854. However, the ground view sensor 848A of FIG. 6 is adapted to detect furrow depth 854 directly, without reliance on detection of gauge wheels 832, gauge wheel arms 866, or other assumed dimensional values. By divorcing the ground view sensor 848A from measurement of the gauge wheels 832 and gauge wheel arms 866, complications arising from the variation among independent movements of the gauge wheels 832 and gauge wheel arms 866 of a given row unit 818 are avoided.

With reference to FIG. 6, the ground view sensor 848A described herein is positioned rearward of an effective point of the opener 834 (i.e., the longitudinal location at which the opener 834 opens the furrow 836) and forward of an effective point of the closer 840 (i.e., the longitudinal location at which the closer 840 closes the furrow 836) so as to be located above the furrow 836 and to overlap the furrow 836 in plan view. In some constructions, the ground view sensor 848A is centered over the width of the furrow 836 in a direction perpendicular to the longitudinal direction (i.e., the furrow width direction extends into the page when viewing FIG. 6). As illustrated, the ground view sensor 848A is also positioned rearward of a point of contact of the gauge wheel(s) 832 with the soil 720. The ground view sensor 848A can be operable to emit (i.e., from one or more emitters) sound or electromagnetic radiation into the furrow 836 and to detect (i.e., from one or more receivers) a reflection of the sound or electromagnetic radiation from the furrow in order to sense the furrow 836. The ground view sensor 848A thus forms a furrow depth sensor 848A. In other constructions, the ground view sensor 848A can be a passive sensor that senses the furrow 836 to measure furrow depth by detection of the furrow 836 only, without the sensor 848A emitting any sound or electromagnetic radiation.

In some constructions, the ground view sensor 848A is an optical sensor, and may include a photodiode operable to detect light, either within or outside of the visible spectrum. In some constructions, the sensor 848A comprises an infrared sensor, which may be referred to as an IR camera. Such an IR camera can detect the depth of the furrow 836, the quality of closure or covering the soil of the furrow (e.g., with a target soil profile, such as a target planar soil profile, a target concave soil profile or a target convex soil profile immediate after closure of the furrow opening), and may additionally detect the temperature of the furrow 836. The dispensed seeds may have a discernable temperature difference from the soil of the furrow 836, thus enabling seed identification and also seed position data to be collected from the ground view sensor 848A. In some constructions, the sensor 848A comprises an ultrasonic sensor, including an emitter operable to emit ultrasound waves and a receiver operable to detect reflected ultrasound waves that reflect off the furrow 836. In some constructions, the sensor 848A comprises a radar transmitter and receiver. In some constructions, the sensor 848A comprises a laser and a photodetector and may be referred to as a LIDAR or LADAR sensor. With appropriate placement and configuration, the ground view sensor 848A can detect a shape or profile of the furrow 836, or the surface soil 720 rather than just the maximum or central depth thereof. Thus, furrow shape data (i.e., 2-D or 3-D) can also be collected by the ground view sensor 848A. Optionally, more than one such sensor can be positioned above the furrow 836, either for redundancy or collaboratively detecting the furrow depth 854. Multiple sensors can be of the same type or a combination of distinct types. Multiple sensors can be positioned at the same longitudinal position on the row unit 818 or at spaced positions along the longitudinal direction. The illustrated sensor 848A is supported on a mounting arm that supports the furrow closer 840. In other constructions, the sensor 848A is supported by another structure of the row unit 818 (e.g., a dedicated sensor arm or bracket, direct connection to the sub-frame 830).

Although in some constructions, the row unit 818 includes only one or more ground view sensor 848A positioned directly over the furrow 836, FIG. 6 illustrates an optional complement of one or more additional ground view sensors 848B, 848C positioned outside the furrow 836 (e.g., adjacent, but ahead of the furrow 836). These additional ground view sensor(s) 848B, 848C are also supported directly or indirectly by the sub-frame 830. These additional sensor(s) 848B, 848C can utilize any of the type(s) of sensing technology described above for the furrow-viewing sensor 848A. Although the additional sensor(s) 848B, 848C cannot sense the furrow 836 directly, they can still operate as ground viewing sensors used in providing respective output signals related to the furrow depth 854. For example, when there is significant crop residue on the soil 720, the additional sensor(s) 848B, 848C ahead of the furrow 836 can detect how deep the opener 834 is into the soil 720. This is done by detecting reflected electromagnetic radiation off the topsoil surface 858, in combination with the known positional relationship between the opener 834 and the sensor(s) 848B, 848C, since both are fixed with respect to the sub-frame 830. Measurement data collected this way can be used together with the primary over-the-furrow sensor(s) 848A for redundancy, complementation, or compensation. The additional sensor(s) 848B, 848C can be positioned at a variety of locations on the row unit 818, at the same or different longitudinal positions. As illustrated, a first of the additional sensors 848B is supported on a forward end of the sub-frame 830, for example adjacent a linkage (parallel four-bar linkage) that couples the sub-frame 830 to the main frame 714. A second additional sensor 848C is illustrated as being supported on one of the links of the linkage, although other positions are optional. The sensors 848A, 848B, 848C can be aimed to point straight down, such that the sound and/or electromagnetic radiation emitted makes an approximately 90-degree angle with the top surface 858 of the soil 720 as shown. In other constructions, one or more of the sensors 848A, 848B, 848C is or are aimed to point predominantly downward toward the soil 720, at an angle other than approximately 90 degrees.

As illustrated in FIG. 6, in some constructions, ground detection signals from the ground view sensor(s) 848A, 848B, 848C are sent to a controller 878 or control module, which is stored in the implement data storage 152 of FIG. 4 (or the second data storage device 46 of FIG. 3) for execution by the implement data processor 150 of FIG. 4 (or the second data processor 38 of FIG. 3), which may calculate or interpret the depth 854 directly based on the ground detection signals. With respect to any sensor(s) 848A over the furrow 836, the only potential calculation that may be needed is simply the interpretation of distance (e.g., from pulse reflection time) since the sensor 848A operates on direct observation of the furrow bottom 862. In some constructions, the signal output from the sensor(s) 848A may be already conditioned to represent the depth before reporting to the controller 878 or control module. The controller 878 or control module, when coupled to or in communication with a location-determining receiver (10, 134, 166), may generate a seed depth map and store that map for later analysis. In some configurations, an electronic display 882 or user interface is also provided (e.g., in an operator cab), which displays (e.g., in real time) the measured depth 854. The controller 878 may be positioned at various locations on seeding machine 710. For example, in some constructions the controller 878 is positioned within the operator cab, and signals are sent by wire or wirelessly from the sensor(s) 848A, 848B, 848C to the controller 878. In some constructions the sensor(s) 848A, 848B, 848C themselves each or collectively include a controller(s) 878. Other embodiments may include different configurations for the controller 878, where the controller 878 generally comprises an software module or software instructions: (a) that are storable in the implement data storage device 152 of the implement electronics 148 for execution by electronic data processor 150 in FIG. 4; (b) that are storable in the second data storage device 46 of the implement data processing system 42 for execution by the second data processor 38 in FIGS. 3, and/or (c) an electronic module that is integral with the sensor (e.g., 848) or housed in a separate electronic control module with digital logic circuitry, for example. The provision of the sensor(s) 848A, 848B, 848C can, in some constructions, eliminate the need for depth calibration or calculation.

In some constructions the ground view sensor(s) 848A, 848B, 848C described herein provides (provide) signals to the controller 878 that correspond to the depth 854 of the furrow 836. The controller 878 (which may include a memory and a processor for receiving and sending signals and performing calculations) uses the received signals to activate and control movement of the downforce adjustment mechanism 874 and to thus control an overall downforce applied to the row unit 818.

Figure 7:
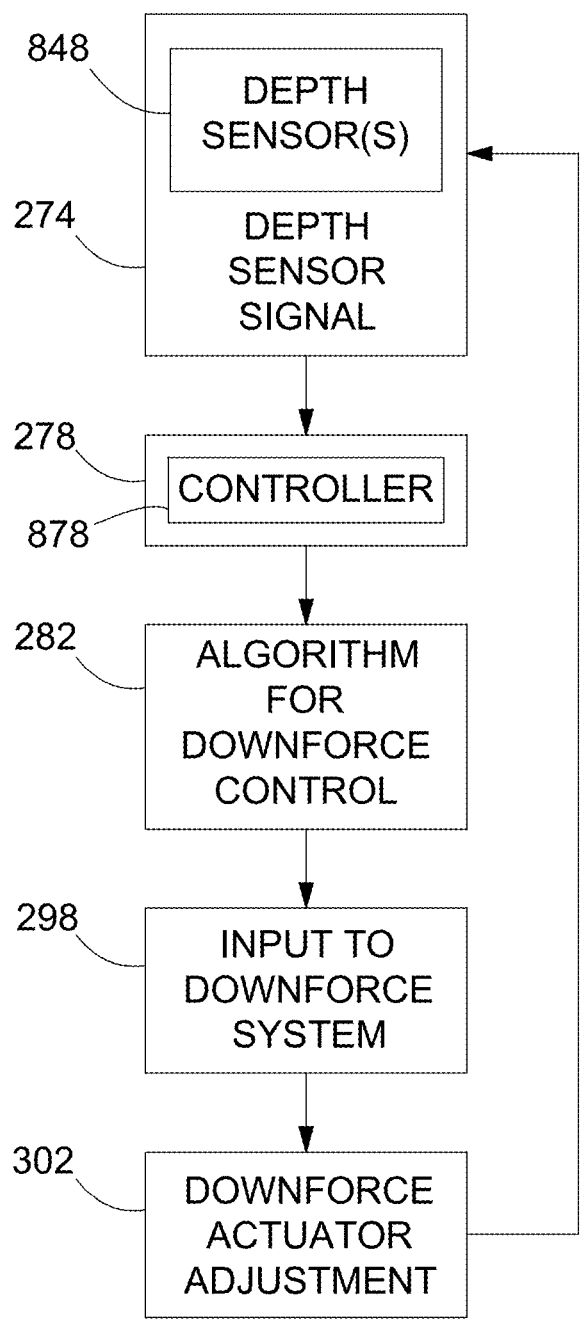
FIG. 7 is a flow chart of one embodiment of a method or estimating performance of an agricultural crop or plant for position-specific control of an agricultural machine.

FIG. 7 illustrates one method of controlling downforce. In a first step S274, one or more of the ground view sensor(s) 848 (e.g., 848A, 848B, 848C), including at least the depth sensor 848A, generates (generate) signals. For the purpose of the flowchart of FIG. 7, the ground view sensor(s)— whether embodied as the singular sensor 848A, or as a plurality of sensors including the sensor 848A—are (is) referred to collectively as the depth sensor(s) 848. In a second step S278, the controller 878 or control module receives the signals from the depth sensor(s) 848 (e.g., wirelessly or with a wired connection). In a third step S282, the controller 878 determines through an algorithm whether the depth 854 of the furrow 836 is within a suitable range of a target value and/or whether the depth is remaining consistent as the seeding machine 710 travels along a field, based on the signals received from the depth sensor(s) 848. If the controller 878 or control module determines that the depth 854 of the furrow 836 is not remaining consistent (e.g., a range of averaged depth being equal to or greater than a preset limit value during a predetermined period of time), then in a fourth step S298, the controller 878 sends a signal to the downforce adjustment mechanism 874, and in a fifth step S302 the downforce adjustment mechanism 874 activates and adjusts (e.g., increases) the downforce on the row unit (718 or 818) to maintain a more consistent furrow depth. Once the downforce has been adjusted, the process repeats, such that the controller 878 is continuously receiving signals from the depth sensor(s) 848 and is continuously making adjustments to the downforce as needed (e.g., creating a closed loop). A similar process for closed-loop control can also be based more simply on whether the measured furrow depth 854 exceeds or fails to meet a desired set point, resulting in a corresponding decrease or increase in downforce via the downforce adjustment mechanism 874 via an actuator (44, 47, 48 of FIG. 3 or, 480, 180, 280, 380 of FIG. 4) such as linear actuator or electric motor with a mechanical screw assembly (e.g., by an amount corresponding to the difference between actual measured depth and the set point).

In some constructions, the controller 878 additionally or alternatively uses the signals from the depth sensor(s) 848, including at least the depth sensor 848A, to control a forward travel speed of the seeding machine 710 (and its row unit or units 818). For example, in some constructions the controller 878 or control module (e.g., stored within a data storage device of implement electronics 148 and executed by the implement (electronic) data processor 150) decreases the forward travel speed of the seeding machine 710 (e.g., via communication with a drive or motor of the seeding machine 710, for example, communication with a tractor pulling the seeding machine 710) if the controller 878 determines that the depth 854 of the furrow 836 is not remaining consistent for a predetermined period of time (e.g., one second, two seconds, three seconds, etc.). After adjusting the speed, the process may repeat, such that the controller 878 is continuously receiving signals from the position sensor or sensors 848 and is continuously making adjustments to the seeding machine speed as needed (e.g., creating a closed loop). In some constructions the downforce is increased and the seeding machine speed is decreased if the controller 878 determines that the depth of the furrow 836 is not remaining consistent for the predetermined period of time. If the controller 878 determines that the depth 854 of the furrow 836 is remaining consistent, then the downforce may be reduced (and in some constructions speed also changed). In some constructions, the controller 878 uses an algorithm that determines a maximum speed at which the seeding machine 10 (and its row unit or units 818) may move forward while still maintaining a consistent furrow depth. In other constructions, the controller 878 uses an algorithm that determines a minimum downforce at which the seeding machine 710 may maintain a consistent furrow depth.

In some constructions, the operator may set a desired forward travel speed (e.g., 6 mph, 8 mph, 10 mph, 12 mph, 14 mph, etc.), a maximum depth variation range (e.g., 0.1 inch, 0.3 inch, 0.5 inch, 0.7 inch, 0.9 inch, etc.), and a maximum downforce (e.g., 50 pounds (lb), 100 lb, 150 lb, 200 lb, 250 lb, 300 lb, 350 lb, 400 lb, etc.). If the controller 878 determines that the depth 854 of the furrow 836 is remaining consistent (i.e., that the depth variation range is equal to or less than the maximum depth variation range) and that the downforce is equal to or less than the maximum downforce, the controller 878 then operates the seeding machine 710 at the desired forward travel speed. If the controller determines that the depth 854 of the furrow 836 is not remaining consistent (i.e., the depth variation range is greater than the maximum depth variation range) or that the downforce is more than the maximum downforce, the controller 878 then slows the forward travel speed so that the depth consistency and the downforce may be within the desired values.

In some constructions, the seeding machine 710 utilizes a soil map (e.g., stored within a memory of the controller 878, and/or created manually). For example, in some constructions the controller 878 determines what settings (speed and downforce) are desirable to achieve the greatest furrow depth consistency, depending on different locations and soil conditions in a field. The controller 878 may then revert back to those settings the next time the seeding machine 710 is in that location of the field (or in another location of the field with the same type of soil), automatically choosing the same settings that obtained the greatest furrow depth consistency.

FIG. 8 is a flow chart of one embodiment of a method for estimating performance of an agricultural crop or plant for position-specific control of an agricultural machine. The method of FIG. 8 begins in step S802.

In step S802, a first sensor or electronic data processor (from the first sensor or a data source accessible via an electronic communications network) is configured to obtain moisture data (e.g., first data layer) during a growing period based on sensor data applicable to the field. For example, a first data layer may comprise the moisture data; the moisture data may be associated with field position that comprises geographic coordinates in two or three dimensions (e.g., of the agricultural machine, its implement, its row unit, or a field sensor (weather) station). In one configuration, a location-determining receiver comprises a Global Navigation Satellite System receiver on the planter implement or row unit of the planter implement.

In step S804, a second sensor or electronic data processor (from the second sensor or a data source accessible via an electronic communications network) is configured to obtain planting date data or temperature data (e.g., individually or collectively second data layer) applicable to planting of a seed or plant in a field for a growing period. For example, a second data layer may comprise the planting date data, the temperature data, or both; the second layer data may be associated with field position that comprises geographic coordinates in two or three dimensions (e.g., of the agricultural machine, its implement, its row unit, and/or a field sensor (weather) station). In one configuration, the location-determining receiver comprises a Global Navigation Satellite System receiver on the planter implement or row unit of the planter implement.

In step S806, the electronic data processor, a seeding sensor, or seeding rate meter, or an imaging device, of a planter is configured to measure the seeding rate, or the seeding depth, or both (e.g., individually or collectively third data layer) for each row of a planter indexed to a position (e.g., geographic coordinates) of the row unit estimated by row position data provided by a location-determining receiver (e.g., GNSS receiver on the planter or seeding implement or a row unit thereof). For example, a third data layer may comprise the seeding rate, or the seeding depth, or both; the third layer data may be associated with field position that comprises geographic coordinates in two or three dimensions (e.g., of the agricultural machine, its implement, or its row unit). In one configuration, the location-determining receiver comprises a Global Navigation Satellite System receiver on the planter implement or row unit of the planter implement.

In step S808, an imaging device, alone or together with an image processing system, measures a planted seedbed/furrow quality (e.g., fourth data layer) associated with the row position data. For example, a fourth data layer may comprise a planted seedbed quality, furrow quality, or both; the fourth layer data may be associated with field position that comprises geographic coordinates in two or three dimensions (e.g., of the agricultural machine, its implement, its row unit, or the imaging device). In one configuration, the location-determining receiver comprises a Global Navigation Satellite System receiver on the agricultural machine, the planter implement or row unit of the planter implement.

In step S810, the electronic data processor or wireless communications device is configured to input (e.g., transmit wirelessly to a central server) the obtained moisture data, planting data, seeding rate and/or seeding depth, and planted seedbed/furrow quality (e.g., first data layer through the fourth data layers, inclusively) to an electronic data processing device, where the electronic data processing device is onboard the vehicle or transmitted to and from a central server via a bidirectional communications channel, link or path. Further, in step S810 the electronic data processing device, the central server, or both are configured with an estimation module to estimate an emergence metric (e.g., emergence percentage and/or emergence date) and/or yield of the crop at a row position basis throughout the field based on analysis of one or more data layers in accordance with a model (e.g., an artificial intelligence model), such as one or more of the following models: a linear regression and classification model, a decision tree model, a nonparametric model, an instance-based learning model, a memory-based learning model, a look-up table model, a nearest-neighbor model, nearest-neighbor regression model, a locally weighted regression model, a gradient-boosting model, a feedforward network model, a convolutional network, or a recurrent neural network.

For example, for a look-up table model, the estimation of the yield references a trained artificial intelligence (AI) model stored in the central server as a look-up table, a file, or other data structure comprising digital filter coefficients for operation of the electronic data processing system, wherein the trained AI model is permitted to have unique or different digital filter coefficients for each field, each zone of a field or each row, or each plant of a field for a grower.

In the data storage device of the central server or in the data storage device of the electronic data processor on board the vehicle, the first data layer comprises the obtained moisture data; a second layer comprises the obtained planting date data; a third data layer comprises the seeding rate and seeding depth; a fourth layer comprises a planted seedbed/furrow quality associated with the row position data. The selection of sample zones of the above data layers is executed according to various techniques, which may be applied separately or cumulatively.

Under a first technique, the electronic data processor or the central server is configured to select sample zones (e.g. data spears 902) for obtaining the first data layer, the second data layer, the third data layer and the fourth data layer based on a variance, deviation or change in the first data layer exceeding a threshold during a sampling interval or a successive series of sampling intervals.

Under a second technique, the electronic data processor or the central server is configured to select data layers (e.g., data spears 902), such as first data layer, the second data layer, the third data layer, and the fourth data layer, where such data layers are associated with corresponding selected sample zones spatially distributed and spaced apart throughout the field to conserve data processing resources.

Under a third technique, the electronic data processor or the central server is configured to cull or to delete (from one or more data storage devices) a first portion of non-selected data within the first data layer, the second data layer, the third data layer and the fourth data layer for areas in the field outside of the selected sample zones to conserve data processing resources, wherein a second portion of the non-selected data is retained or stored for average, mode, median or benchmark yield estimations.

In step S811, the electronic data processing device or electronic display is configured to display or output, via a graphical representation on a graphical user interface of the electronic display, the estimated emergence metric and/or yield of the crop on a row position basis throughout the field. For example, the central server or electronic data processor, or both, are configured to collect high-fidelity layer data on a selected zone of one or more plants or a block section of plans to determine models, a field level model, a subfield model level or a plant model level to determine (e.g., estimate or drive within boundaries) management of the crop or plants based on machine adjustments and management practices that are displayable on the electronic display to an operator, or that are wirelessly provided an operator remotely controlling or monitoring the agricultural machine. Further, the central server, the electronic data processor, or both, may suggest or recommend a prescription for the management practices to reduce variability in the estimated yield.

In an alternate embodiment, a prescription, yield estimate or performance estimate provided by the central server, the electronic data processor, or both, may be accessible wirelessly via a portable wireless device to retrieve yield estimates for the field to make potential management decisions for the field or crop.

FIG. 9 is a flow chart of another embodiment of a method for estimating performance of an agricultural crop or plant for position-specific control of an agricultural machine. The method of FIG. 9 is similar to the method of FIG. 8, except the method of FIG. 9 further comprises step S812.

In step S812, on a regular basis (e.g., daily or weekly basis), the electronic data processor evaluates, via remote imaging or aerial imaging (e.g., balloon or drone flight paths over the field), a performance of the crop for data spear zones (e.g., sampled zones) throughout the field to estimate a benchmark or reference standard for any of the following: observed emergence date, observed yield, observed biomass, observed plant height or volume, observed plant vigor, and plant nitrogen content to determine a prescription (e.g., the target planting depth and/or planting rate; or a seeding, crop-care and/or harvest prescription) for one or more rows, zones, plants or positions in the field for a prescription for the next planting season of the filed or another filed with similar values associated with the first through fourth data layers.

Figure 10:
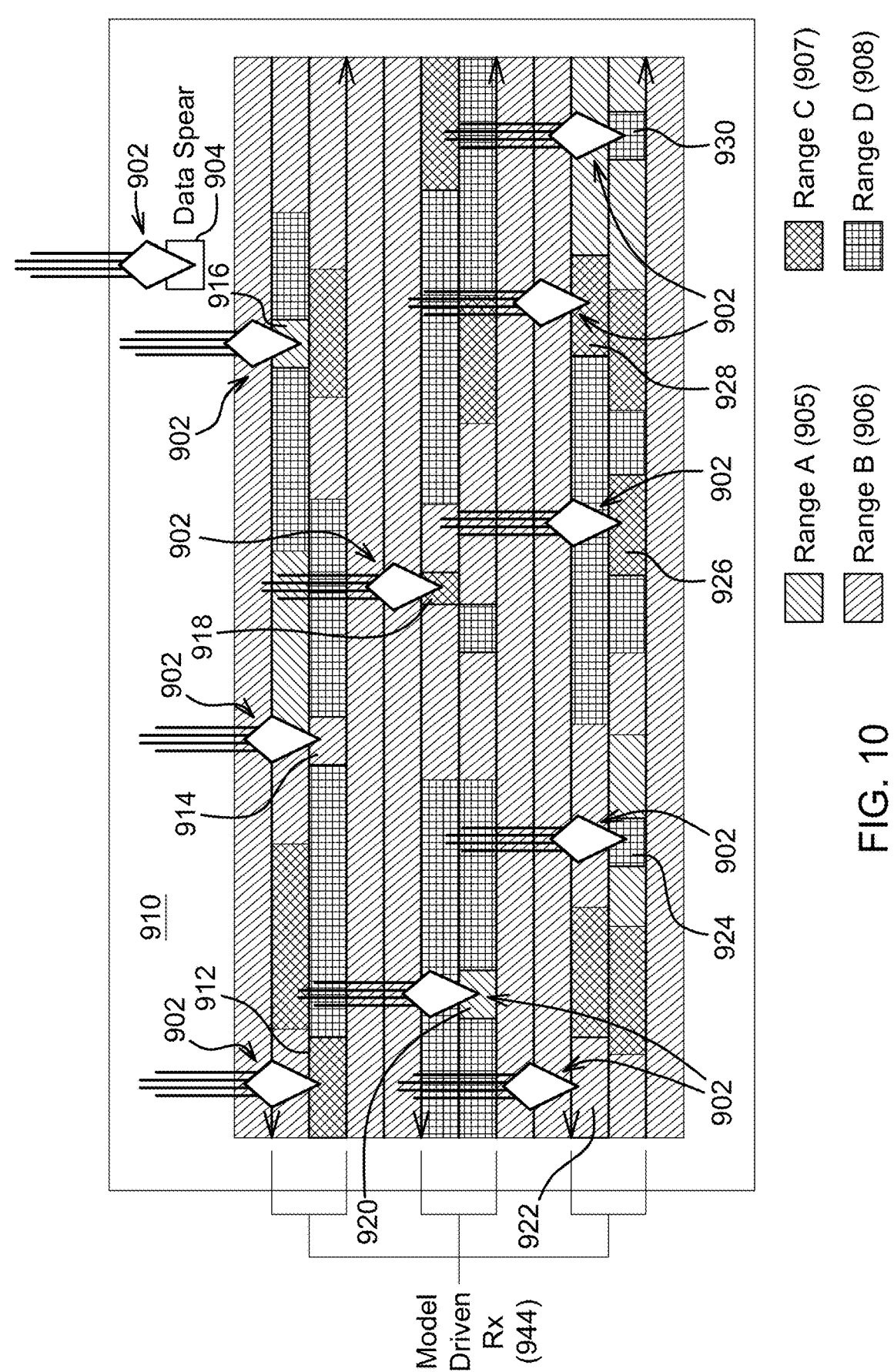
FIG. 10 is a plan view of a field with one possible set of illustrative data spears and ranges of a control parameter versus field zone for an agricultural machine.

FIG. 10 is a plan view of a field 910 with one possible set of illustrative data spears 920 and ranges of a control parameter versus field zone for an agricultural machine. The data spear methodology creates a solution that facilitates the combination of two significant aspects: (1) targeted/triggered high fidelity data capture (e.g., a set of data layers of plant-related data) of samples zones or data spears 902 and (2) geospatial machine setting changes (either prescribed or reactionary) that has the potential to facilitate a prescription 944, a zone-based prescription, a row-based prescription, or a plant-by-plant prescription to determine control or settings of an agricultural machine or its implement. For example, prescriptions 944 may comprise a planting depth versus field position or plant row position; a seeding rate, population or density versus field position or plant row position; a furrow quality or opening quality versus a field or plant row position. As illustrated in FIG. 10, the Range A (905), Range B (906), Range C (907) and Range D (908) represent a set of different machine settings or implement settings that are part of a prescription 944 resulting from processing of captured or collected data layers associated with a set of data spears 902 within the field 910. For example, each range (905, 906, 907, 908) may be bound by a lower limit and an upper limit for a respective machine setting or implement setting.

For each field, big-data processing techniques would be required to process and interpret the collected data to provide prescriptions or machine settings in the absence of selecting targeted data samples, which is referred to as the "data spear" (902) technique of selecting proxies or representative samples of data layers that relate to one or more seeds, plants or clusters of plants within a row or block section of plants. The selected data samples or data spears 902 are selected strategically by corresponding positions (e.g., row (of plants or seeds), row section (of plants or seeds), particular zone (of field, soil, plants or seeds), a plant or cluster of plants, where a position can be expressed in two or three dimensional coordinates) in the field (e.g., which are generally distributed throughout the field and spaced apart from each other), based on: one or more data layers associated with the respective the data spear 902 or respective selected sample that meet or exceed a threshold variance, a threshold deviation (e.g., coefficient from approximately 0.01 to 3 multiplied by the standard deviation), or a threshold change per unit time in any data layer or set of data layers. For example, the threshold change per unit time (e.g., in plant related-attributes or seed-related attributes) in the set of one or more data layers, which lead to the selected sample or data spear 902, may comprise one or more of the following items: a threshold change per unit time in historical yield, plant maturity, plant vigor, germination rate, germination, greenness, nitrogen content, or another agronomic data metric. Each selected sample or data spear 902 is associated with a zone of the fi In certain embodiments, the data that is not selected can be culled or deleted to reduce the data storage and data processing resources required to evaluate the performance of the plants.

In one embodiment, the selected data (or data spears 902) of one or more data layers is collected and processed by an electronic data processor on-board the vehicle or at a central server to create or train a model of each field 910, zone or subsection of the field or plant, where the collected data is high fidelity detailed regarding the subsection of the field or plant. Here, in one possible example of FIG. 10, the data spears 902 are associated with layer data corresponding to any of the following: first zone 912, second zone 914, third zone 916, fourth zone 918, fifth zone 920, sixth zone 922, seventh zone 924, eighth zone 926, ninth zone 928, and tenth zone 930.

The trained model (e.g., trained artificial intelligence model) on a central server, or an on-board data processing system of the vehicle, or both can provide prescriptions 944 that drive machine controls to geospatially change machine performance. In one configuration, the strategically selected samples based on their variance of attributes can be used to promote or accelerate the ability to train a field scale agronomic model of many plants.

In FIG. 10, the map of the field or portion of the field is divided into paths or passes of the agricultural machine or equipment through the field, where each path or pass has a swath width or implement width of the implement associated with treating, planting, harvesting, spraying or processing a plant or crop input for the plant. The arrows indicate the direction of travel of a centerline of the agricultural machine or vehicle, and its implement, where the swath is divided into a first set of one or more rows and a second set of one or more rows, where the first set and the second set of rows may be assigned different prescriptions or plant settings. For example, in the illustrative example of FIG. 10 the uppermost pass of the vehicle travels from the right to the left, as indicated by the arrow; the first set of (plant) rows is associated with Range B (906) for the corresponding setting of the agricultural machine or implement. Meanwhile, from right the left in the uppermost pass of the vehicle, the second set of (plant) rows: is firstly associated with Range B (e.g., 906, for machine or implement setting) for a corresponding setting of the agricultural machine or implement; is secondly associated with range D (e.g., 908, for machine or implement setting), which is interrupted by a brief segment of Range A (e.g., 905, for machine or implement setting); is thirdly associated with Range A (e.g., 905, for machine or implement setting); is fourthly associated with Range C (e.g., 907 for machine or implement setting); fifthly associated with Range B (e.g., 906, for machine or implement setting).

Figure 11:
FIG. 11 is a plan view of a field with one possible set ranges of a control parameter versus field zone for an agricultural machine and illustrative direction of travel of the agricultural machine.

FIG. 11 is a plan view of a field 910 with one possible set ranges of a control parameter versus field zone for an agricultural machine and illustrative direction of travel of the agricultural machine. FIG. 11 is similar to FIG. 10. Like reference numbers in FIG. 10 and FIG. 11 indicates like features or elements. FIG. 11 indicates that the swath width or implement width 945 of a pass of the agricultural machine or its implement. Further, each pass or path of the agricultural vehicle has a first side 946 and second side 948, where the first side is a first set of one or more rows (e.g., plant rows) and where the second side is second set of one or more rows (e.g., plant rows).

Figure 12:
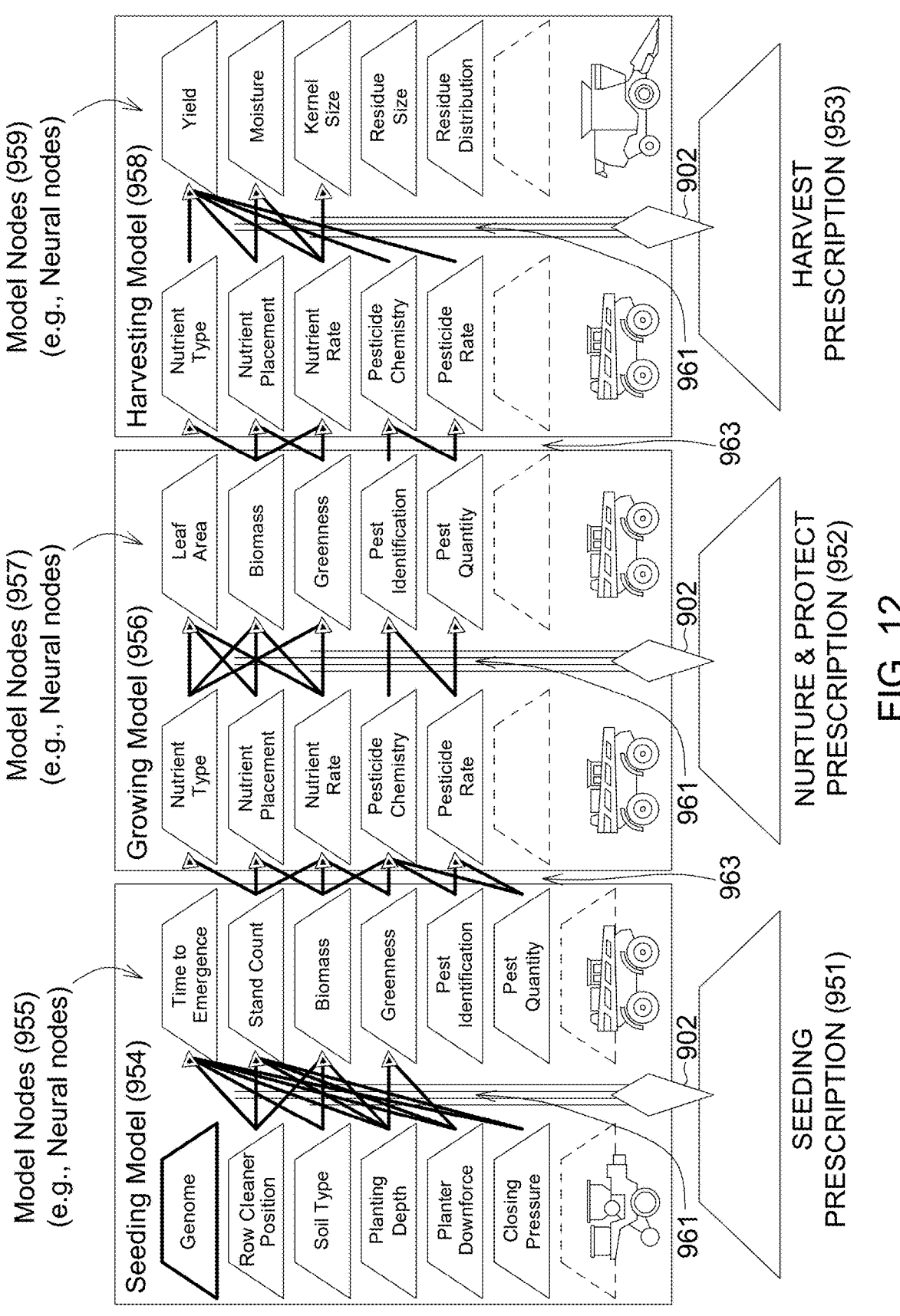
FIG. 12 is a block diagram of one embodiment of a seeding model, a growing model and a harvesting model for one or more plants or zones of a field, which is based on data collected via the data spears.

FIG. 12 is a block diagram of one embodiment of a seeding model, a growing model and a harvesting model for one or more plants or zones of a field, which is based on data collected via the data spears. In one embodiment, the electronic data processing device, the central server, or both are configured with an estimation module to estimate an emergence metric (e.g., emergence percentage and/or emergence date) and/or yield of the crop at a row position basis throughout the field based on analysis of one or more data layers in accordance with a model (e.g., an artificial intelligence model) that comprises one or more of the following: a seeding model 954, a growing model 956, or a harvesting model 958. Each of the seeding model 954, the growing model 956, and the harvesting model 958 may comprise one or more of the following artificial intelligence models: a linear regression and classification model, a decision tree model, a nonparametric model, an instance-based learning model, a memory-based learning model, a look-up table model, a nearest-neighbor model, nearest-neighbor regression model, a locally weighted regression model, a gradient-boosting model, a feedforward network model, a convolutional network, or a recurrent neural network. Further, each of the seeding model 954, the growing model 956, and the harvesting model 958 may comprise a software instructions or software modules that are: (a) stored in a data storage device and (b) executable by the electronic data processor, electronic data processing system, or the central server to provide or output a prescription to an electronic display of the agricultural machine or to output control logic or settings for the agricultural machine or its implement to facilitate improved yield, seeding or agronomic management practices.

As illustrated in FIG. 12, the seeding model 954 comprises one or more model nodes 955, such as neural nodes of neural network, a feedforward network, a recurrent network, a gradient descent or ascent model, a linear regression model, a deep learning network model, or the like. The model nodes 955 may represent input nodes, intermediate nodes and output nodes including one or more of the following nodes 955: plant or seed genetics or genome, row cleaner position, soil parameters or soil type, planting depth, planter downforce, closing pressure, time to (plant) emergence, stand count or emergence percentage, biomass, greenness, normalized different vegetation index (NDVI), or plant foliage color, pest identification, and pest quantity. The nodes 955 may interact with each via communication paths 961 between the input nodes and the output nodes (e.g., to establish coefficients of digital filter representation of the seeding model 954, where the established coefficients are storable in a look-up table), wherein the data spear 902 provides data layers (e.g., of plant-related data) as inputs to the input nodes. One or more output nodes or communication paths 961 may provide a seeding prescription 951 for a field, zone, row, section of a row, or plant based on processing of the inputted data layers in accordance with the seeding model 954, such as an AI model.

In one embodiment, the growing model 956 comprises one or more model nodes 957, such as neural nodes of neural network, a feedforward network, a recurrent network, a gradient descent or ascent model, a linear regression model, a deep learning network model, or the like. The model nodes 957 may represent input nodes, intermediate nodes and output nodes including one or more of the following nodes 957: nutrient parameters or nutrient type, nutrient timing, nutrient placement, nutrient rate, pesticide chemistry, pesticide rate, leaf area, biomass, greenness, normalized different vegetation index (NDVI), or plant foliage color, pest identification, and pest quantity. The nodes 957 may interact with each via communication paths 961 between the input nodes and the output nodes (e.g., to establish coefficients of digital filter representation of the growing model 956, where the established coefficients are storable in a look-up table), wherein the data spear 902 provides data layers (e.g., of plant-related data) as inputs to the input nodes. One or more output nodes or communication paths 961 may provide a growing prescription 952 (e.g., nurture and protect prescription) for a field, zone, row, section of a row, or plant based on processing of the inputted data layers in accordance with the growing model 956, such as an AI model.

In one embodiment, the harvesting model 958 comprises one or more model nodes 959, such as neural nodes of neural network, a feedforward network, a recurrent network, a gradient descent or ascent model, a linear regression model, a deep learning network model, or the like. The model nodes 959 may represent input nodes, intermediate nodes and output nodes including one or more of the following nodes 959: nutrient parameters or nutrient type, nutrient timing, nutrient placement, nutrient rate, pesticide chemistry, pesticide rate, yield, moisture, biomass, kernel size, residue size, plant volume or foliage volume, and residue distribution. The nodes 959 may interact with each via communication paths 961 between the input nodes and the output nodes (e.g., to establish coefficients of digital filter representation of the harvesting model 958, where the established coefficients are storable in a look-up table), wherein the data spear 902 provides data layers (e.g., of plant-related data) as inputs to the input nodes. One or more output nodes or communication paths 961 may provide a harvest prescription 953 for a field, zone, row, section of a row, or plant based on processing of the inputted data layers in accordance with the harvesting model 957, such as an AI model in accordance with neural nodes of neural network, a feedforward network, a recurrent network, a gradient descent or ascent model, a linear regression model, a deep learning network model, or the like.

Figure 13:
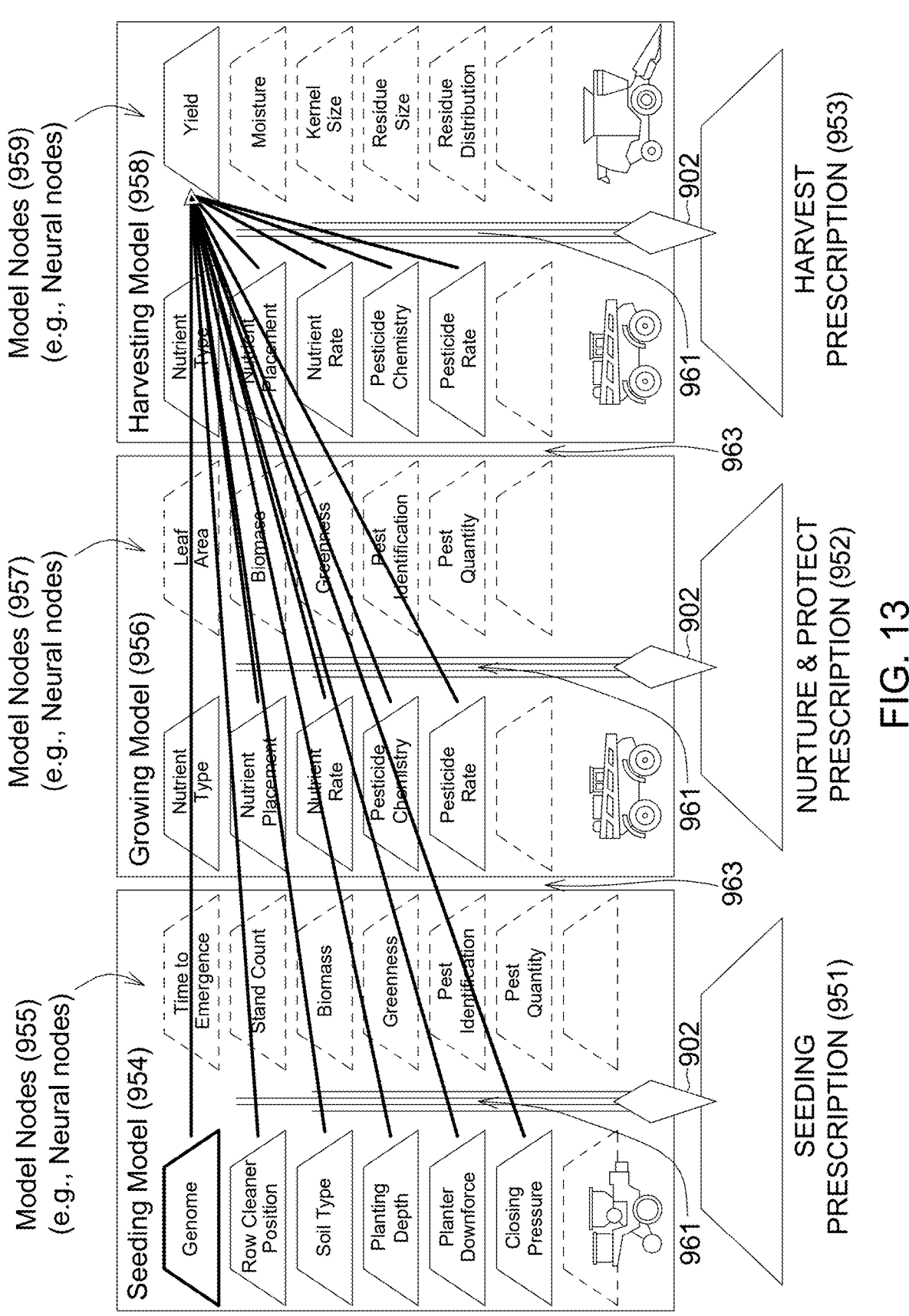
FIG. 13 is a block diagram of another embodiment of a seeding model, a growing model and a harvesting model that supports estimation of yield of the crop for one or more plants or zones of a field, which is based on data collected via the data spears.

FIG. 13 is a block diagram of another embodiment of a seeding model, a growing model and a harvesting model that supports estimation of yield of the crop for one or more plants or zones of a field, which is based on data collected via the data spears. The system and models of FIG. 13 are similar to the system and models of FIG. 12. Like reference numbers in FIG. 12 and FIG. 13 indicate like elements or features, for example.

In FIG. 13, the model nodes 955 of the seeding model 954 are configured to be compatible with the model nodes 959 of the harvesting model 958, such that data communication paths 961 are supported between model nodes of any set of two or more models, among the seeding model 954, the growing model 956, and the harvesting model 958. Similarly, the model nodes 957 of the growing model 956 are configured to be compatible with the model nodes 959 of the harvesting model 958 such that data communication paths 961 are supported between model nodes of any set of two or more models, among the seeding model 954, the growing model 956, and the harvesting model 958. Essentially, the seeding model 954, the growing model 956 and the harvesting model 958 are modular and hierarchical, to support successive layers of a universal AI model to provide a yield estimate of a field, a zone, a (plant) row or a plant in accordance with neural nodes of neural network, a feedforward network, a recurrent network, a gradient descent or ascent model, a linear regression model, a deep learning network model, or the like.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A method for determining the yield of a crop in a field, the method comprising:

obtaining moisture data during a growing period based on sensor data applicable to the field;

obtaining planting date data applicable to planting of a seed or plant in the field for the growing period;

measuring at least one of a seeding rate or a seeding depth for each row of a planter indexed to a position of the row unit estimated by row position data provided by a location-determining receiver;

measuring, by an imaging device in conjunction with an image processing system, a planted seedbed/furrow quality associated with the row position data; and applying or inputting the obtained moisture data, planting data, seeding rate or seeding depth, and planted seedbed/furrow quality to an electronic data processor of a central server, the electronic data processor that is configured to estimate a yield of the crop at a row position basis throughout the field;

wherein a first data layer comprises the obtained moisture data; a second data layer comprises the obtained planting date data; a third data layer comprises the seeding rate or seeding depth; a fourth data layer comprises a planted seedbed/furrow quality associated with the row position data; and selecting sample zones for obtaining the first data layer, the second data layer, the third data layer and the fourth data layer based on a variance, deviation or change in the first data layer exceeding a threshold during a sampling interval or a successive series of sampling intervals.

2. The method according to claim 1 wherein the first data layer, the second data layer, the third data layer, and the fourth data layer are associated with selected sample zones spatially distributed and spaced apart throughout the field to conserve data processing resources.

3. The method according to claim 2 further comprising: culling or deleting a first portion of non-selected data within the first data layer, the second data layer, the third data layer and the fourth data layer for areas in the field outside of the selected sample zones to conserve data processing resources, wherein a second portion of the non-selected data is retained or stored for average, mode, median or benchmark yield estimations.

* * * * *